United States Patent
Eom et al.

(10) Patent No.: US 10,072,949 B2
(45) Date of Patent: Sep. 11, 2018

(54) METHOD AND DEVICE FOR MEASURING ROTARY INPUT HAVING A ROTARY MEMBER ENCLOSING AND ROTATING WITH RESPECT TO A MAIN BODY INCLUDING A FIRST AND A SECOND REGION CORRESPONDING TO A FIRST AND A SECOND ATTRIBUTE

(71) Applicant: Samsung Electronics Co., Ltd., Gyeonggi-do (KR)

(72) Inventors: Ki-Hun Eom, Gyeonggi-do (KR); Tae-Gyun Kim, Seoul (KR); Hee-Young Yun, Gyeonggi-do (KR); Hee-Woong Yoon, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 52 days.

(21) Appl. No.: 15/207,629

(22) Filed: Jul. 12, 2016

(65) Prior Publication Data

US 2017/0097248 A1  Apr. 6, 2017

(30) Foreign Application Priority Data

Oct. 6, 2015  (KR) .......................... 10-2015-0140188

(51) Int. Cl.
*G04G 21/00* (2010.01)
*G01D 5/30* (2006.01)
*G04C 3/00* (2006.01)

(52) U.S. Cl.
CPC .............. *G01D 5/30* (2013.01); *G04C 3/001* (2013.01); *G04G 21/00* (2013.01)

(58) Field of Classification Search
CPC ........ G01D 5/30; G01D 5/2451; G04C 3/001; G04G 21/00; H03M 1/305
USPC ............................................. 250/231.13, 221
See application file for complete search history.

(56) References Cited

U.S. PATENT DOCUMENTS

| 5,841,132 | A * | 11/1998 | Horton ................... G01D 5/347 250/231.13 |
| 7,064,316 | B2 * | 6/2006 | Steinlechner ............ B62D 6/10 250/231.14 |
| 2013/0099009 | A1 | 4/2013 | Filson et al. |

FOREIGN PATENT DOCUMENTS

KR   10-0685218 B1   2/2007

* cited by examiner

*Primary Examiner* — Que T Le
(74) *Attorney, Agent, or Firm* — Cha & Reiter, LLC

(57) ABSTRACT

An electronic device may include a main body; a rotary member rotatably mounted upon and enclosing at least a portion of the main body, the rotary member including a first region corresponding to a first attribute and a second region corresponding to a second attribute, the first and second regions being alternately arranged on one face of the rotary member; a sensor module configured to acquire attribute information corresponding to at least a partial region of the rotary member as the rotary member is rotated; and a processor, wherein the processor is configured to confirm a change in at least one of the first attribute and the second attribute and to determine at least one of a rotated angle and a rotated direction of the rotary member based on the change.

20 Claims, 12 Drawing Sheets

METHOD AND DEVICE FOR MEASURING ROTARY INPUT HAVING A ROTARY MEMBER ENCLOSING AND ROTATING WITH RESPECT TO A MAIN BODY INCLUDING A FIRST AND A SECOND REGION CORRESPONDING TO A FIRST AND A SECOND ATTRIBUTE

CLAIM OF PRIORITY

This application claims the priority under 35 U.S.C. § 119(a) to Korean Application Serial No. 10-2015-0140188, which was filed in the Korean Intellectual Property Office on Oct. 6, 2015, the entire contents of which are hereby incorporated by reference.

TECHNICAL FIELD

Various embodiments of the present disclosure generally relate to an electronic device, and more particularly, to an electronic device that generates an input signal through a rotary member, and a method of measuring a rotated angle.

BACKGROUND

Typically, an electronic device refers to a device that performs a specific function according to an equipped program (e.g., an electronic scheduler, a portable multimedia reproducer, a mobile communication terminal, a tablet PC, an image/sound device, a desktop or laptop PC, or a vehicular navigation system, etc.), as well as a home appliance. Such an electronic device may, for example, output information stored therein as sound or an image. As the degree of integration of such an electronic device has increased, and super-high speed and large capacity wireless communication has become popular, various functions have recently been equipped in a single mobile communication terminal. For example, functions (such as an entertainment function (e.g., a game function), a multimedia function (e.g., a music/video reproducing function), a communication and security function for mobile banking, a schedule management function, and an e-wallet function) are integrated in a single electronic device, in addition to a communication function.

The size of various electronic devices has been gradually miniaturized while implementing the same performance. For example, while television receivers generally had a box shape in the past, the television receivers have been recently made in a flat plate shape, and the thicknesses thereof have been gradually reduced. In addition, the electronic devices have been improved in performance and reduced in size such that they may be worn on a user's body.

SUMMARY

As electronic devices are reduced in size, providing a battery having a sufficient capacity may be difficult. Also, complicated by the reduced size of electronic devices is the ability of the device to function as an input/output device and/or be coupled with external devices.

Various embodiments of the present disclosure of the present disclosure provide an electronic device that includes various types of input devices even though the size of the electronic device is relatively small as compared to conventional devices having input devices.

In addition, various embodiments of the present disclosure provide an electronic device that has a simple structure, but is capable of easily detecting an input operation through an input device.

Further, various embodiments of the present disclosure are to provide an electronic device that includes an input device that uses a rotary member, and a method that is capable of calculating the rotated angle of the rotary member more accurately.

According to various embodiments, an electronic device may include: a main body; a rotary member rotatably mounted upon and enclosing at least a portion of the main body, and including a first region corresponding to a first attribute and a second region corresponding to a second attribute, and are alternately arranged on one face of the rotary member; a sensor module configured to acquire attribute information corresponding to at least a partial region of the rotary member as the rotary member is rotated; and a processor. The processor may be configured to confirm a change in the first attribute or the second attribute of at least the partial region based on the attribute information of at least one of the first region and the second region, and to determine a rotated angle or a rotated direction of the rotary member based on the change.

According to various embodiments of the present disclosure, there is provided a method of calculating a rotated angle of a rotary member in an electronic device that includes the rotary member. The method may include: setting at least one initial value calculated to correspond to light intensity information at a set rotary section; detecting at least one of a rotated angle and a rotated direction based on the change of the light intensity information when the rotary member is rotated; calculating a value corresponding to a change of the light intensity information when the rotary member is rotated over the set rotary section and comparing the calculated value to the set initial value; and correcting the initial value corresponding to the set rotary section depending on a comparison result of the calculated value and the set initial value. The light intensity information may be acquired through light reflected from at least one first region and at least one second region, which correspond to a first attribute and a second attribute, respectively, and are alternately formed on one face of the rotary member.

The electronic device according to various embodiments of the present disclosure may contribute to the diversification of an input device since input actions (e.g., search, moving, and scroll) may be executed using the rotary member. In addition, since the rotary member may be formed in a ring shape that is rotated on one face of the electronic device to be installed around a display device, the rotary member may be easily mounted on a miniaturized electronic device. The electronic device according to various embodiments of the present disclosure may utilize an optical sensor module in detecting a rotated angle of the rotary member. The electronic device according to various embodiments of the present disclosure may perform a correct input operation by detecting a rotated angle through surfaces that have different attributes, respectively, and by correcting an error in the detected rotated angle periodically or irregularly. For example, with the electronic device according to various embodiments of the present disclosure, it is possible to avoid an incorrect input operation caused by an input deviation appearing among different products having the same specification or a cumulative error according to repeated use for a long period of time.

These and other aspects of the present disclosure are more fully described hereinbelow with reference to the accompanying figures.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
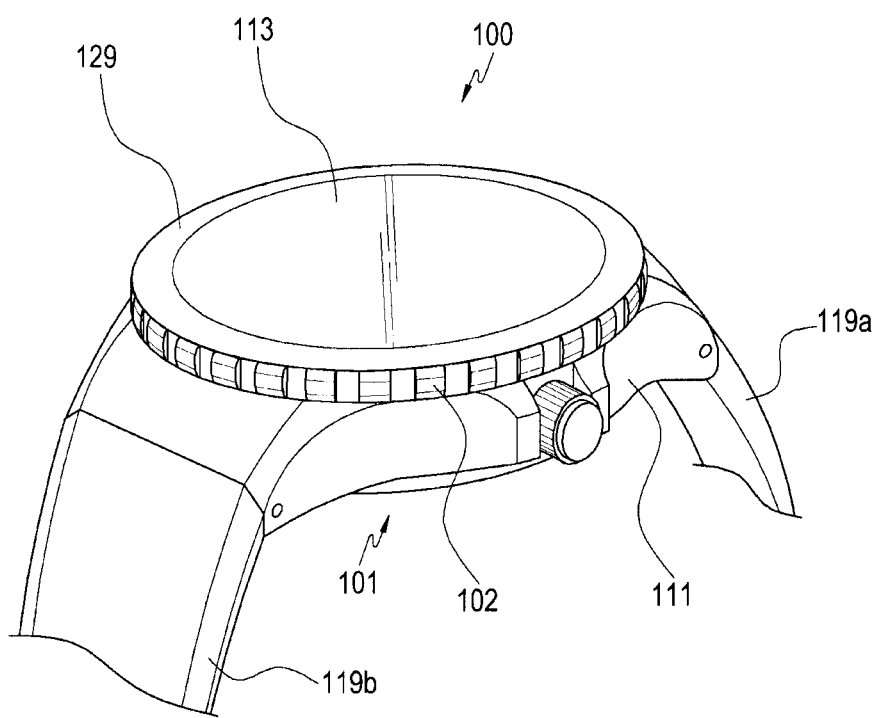
FIG. 1 is a perspective view illustrating an electronic device according to various embodiments of the present disclosure.

Hereinafter, various embodiments of the present disclosure are described herein with reference to the accompanying drawings. It should be understood that there is no intent to limit the present disclosure to the particular forms disclosed herein; rather, the present disclosure should be construed to cover various modifications, equivalents, and/or alternatives of embodiments of the present disclosure. In the description of the drawings, similar reference numerals may be used to designate similar elements.

In the various embodiments of the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

When it is mentioned that one element (e.g., a first element) is "(operatively or communicatively) coupled with/to or connected to" another element (e.g., a second element), it should be construed that the one element is directly connected to the another element or the one element is indirectly connected to the another element via yet another element (e.g., a third element). In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

In the present disclosure, terms are used to describe specific embodiments, and are not intended to limit the present disclosure. For example, as used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not exclude the existences or probability of addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present specification. In some cases, even the term defined in the present disclosure should not be interpreted to exclude embodiments of the present disclosure.

In the present disclosure, an electronic device may be a random device, and the electronic device may be called a terminal, a portable terminal, a mobile terminal, a communication terminal, a portable communication terminal, a portable mobile terminal, a display device or the like.

For example, the electronic device may be a smartphone, a portable phone, a game player, a TV, a navigation device, a heads-up display unit for a vehicle, a notebook computer, a laptop computer, a tablet Personal Computer (PC), a Personal Media Player (PMP), a Personal Digital Assistants (PDA), and the like. The electronic device may be implemented as a portable communication terminal which has a wireless communication function and a pocket size. Further, the electronic device may be a flexible device or a flexible display device.

The electronic device may communicate with an external electronic device, such as a server or the like, or perform an operation through an interworking with the external electronic device. For example, the electronic device may transmit an image photographed by a camera and/or position information detected by a sensor unit to the server through a network. The network may be a mobile or cellular communication network, a Local Area Network (LAN), a Wireless Local Area Network (WLAN), a Wide Area Network (WAN), an Internet, a Small Area Network (SAN) or the like, but is not limited thereto.

Figure 2:
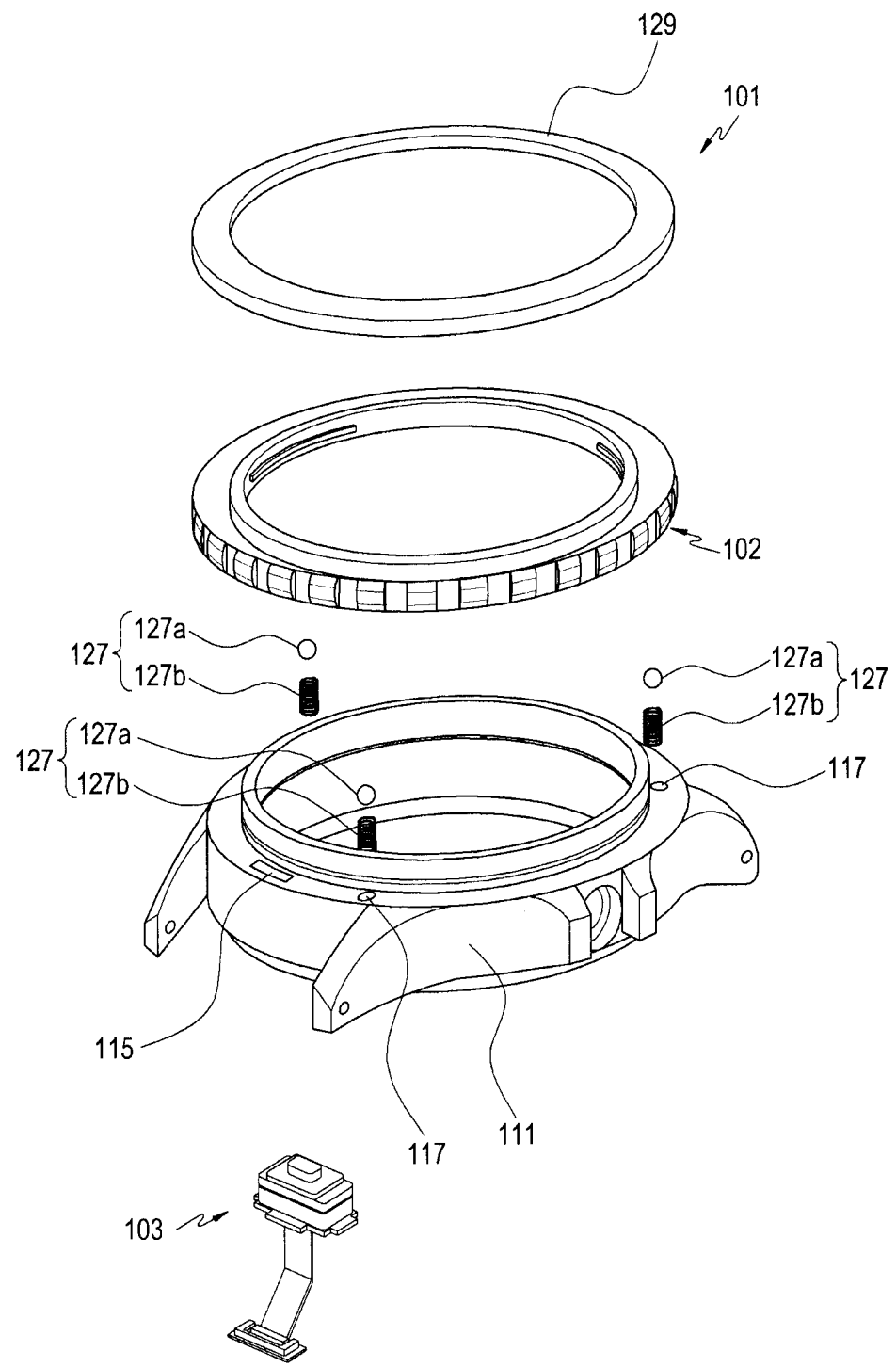
FIG. 2 is an exploded perspective view illustrating the main body of an electronic device according to various embodiments of the present disclosure.
Figure 3:
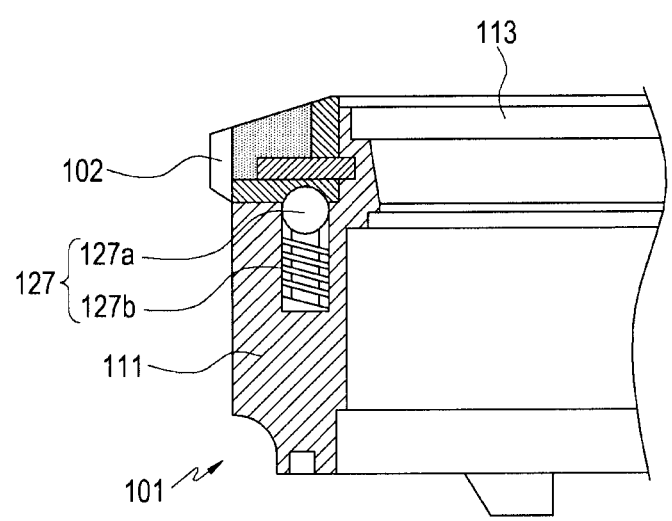
FIG. 3 is a sectional view illustrating the main body of the electronic device according to various embodiments of the present disclosure in a state in which a portion of the main body is cut.

FIG. 1 is a perspective illustrating an electronic device 100 according to various embodiments of the present disclosure. FIG. 2 is an exploded perspective view illustrating the main body of an electronic device 100 according to various embodiments of the present disclosure. FIG. 3 is a sectional view illustrating the main body of the electronic device 100 according to various embodiments of the present disclosure in a state in which a portion of the main body is cut.

Referring to FIGS. 1 to 3, an electronic device 100 according to various embodiments of the present disclosure may be configured to be worn on a user's body. For example, the electronic device 100 may include a main body 101 and wearing members 119a and 119b, which function as a strap for the watch, extending from the opposite sides of the main body 101 to be away from each other. The user may wear the body 101 on the user's body, for example, by positioning the main body 101 on a wrist, and then binding the wearing members 119a and 119b to each other. It is to be understood, however, that the electronic device 100 according to various embodiments of the present disclosure is not necessarily limited to a wearable electronic device. For example, the electronic device according to various embodiments of the present disclosure may include other electronic devices, such as a broadcasting image editing device and a vehicle information device. The electronic device 100 may include an input device having a rotary member 102 mounted to be rotatable on the main body 101.

The main body 101 may include a housing 111 configured to accommodate various electronic components, such as a processor and a communication module, and a display device 113 provided on the front face of the housing 111. The display device 113 may be integrated with a touch panel to be used as an input device.

The rotary member 102 may include a ring member mounted, for example, on the front face of the housing 111 and enclosing at least a portion of the main body 101 to be rotated clockwise and/or counterclockwise. For example, the rotary member 102 may have a ring shape, and may be mounted on the main body 101 to be rotatable thereon. The rotary member 102 may be disposed around the display device 113. On the outer periphery of the rotary member 102, recesses and protrusions may be alternately arranged along the circumferential direction of the rotary member 102 so that the user may easily operate the rotary member 102. An ornamental member 129 may be mounted on the front face of the rotary member 102. The ornamental member 129 may be exposed as is the exterior of the main body 101, and figures, characters, and various patterns may be carved on the ornamental member 129 in order to provide an ornamental effect. A specific embodiment of the present disclosure exemplifies a configuration in which the ornamental member 129 is made in the form of a component separate from the rotary member to be assembled therewith. According to various embodiments, however, the ornamental member 129 may be integrally fabricated with the rotary member 102.

As shown in FIGS. 2-3, the electronic device 100 may further include one or more detents 127 mounted on the main body 101. Each detent 127 may be formed by a combination of a ball 127a and a spring 127b, and may be mounted such that the ball 127a is supported by the spring 127b on the main body 101, and may partially protrude to the outside of the electronic device 100. As the rotary member 102 is rotated while the ball 127a is supported by the spring 127b, the ball 127a may rub against a face of the rotary member 102. The frictional force acting between the detent 127 and the rotary member 102 may prevent the rotary member 102 from being unintentionally rotated. For example, since the detents 127 provide frictional force, the rotary member 102 can be rotated only when an external force exceeding a predetermined magnitude is applied thereto.

According to various embodiments, a plurality of holes (e.g., recess 121c shown in FIG. 7) may be formed on the rotary member 102 to correspond to the detents 127. For example, the holes may be formed along a trace (e.g., groove 121d shown in FIG. 7) where the detents 127 rub as the rotary member 102 is rotated, and each detent 127 may generate a click feeling by being engaged in one of the holes. The click feeling generated by the detent 127 may enable the user to recognize, in an acoustic or tactile manner, that the rotary member 102 is being rotated.

The electronic device 100 may include a sensor module 103b configured to detect the rotation of the rotary member 102. A sensor hole 115 may be formed on the main body 102 to correspond to the position of the sensor module 103, and the sensor module 103 may detect, through the sensor hole 115, for example, whether the rotary member 102 is rotated, a rotated direction, and a rotated angle.

The sensor module 103 may sense whether the rotary member 102 is rotated. The sensor module 103 may detect the rotated angle and rotated direction of the rotary member 102 through at least one processor included within the sensor module 103 and may generate a signal corresponding thereto. For example, when it is detected that the rotary member 102 is rotated 10 degrees or more, the sensor module 103 may generate an input signal that activates the display device 113, which is may have been in a sleep mode prior to such activation. According to various embodiments, while the rotary member 102 is continuously rotated 30 degrees or more, the sensor module 103 may generate an input signal that activates the display device 113 and another input signal that executes a phone mode or operation sequentially. According to one embodiment, at least one piece of pixel data acquired through the sensor module 103 is transferred to at least one processor (a processor configured separately from the sensor module 103) electrically connected to the sensor module 103, and the processor may detect the rotated angle or rotated direction of the rotary member.

The input signal generated by the sensor module 103 may be practically generated through a processor and/or an input/output interface within the electronic device 100, rather than by the sensor module 103. For example, the sensor module 103 merely detects whether the rotary member 102 is rotated and/or the rotated angle of the rotary member 102, and an input signal may be generated through, for example, an internal program or a control of the electronic device 100 depending on the rotated angle detected through the sensor module 103. The signal generated depending on the rotation of the rotary member 102 may change the user interface of the electronic device 100 depending on the operating mode of the electronic device 100. The signal generated may correspond to the rotated angle or rotated direction of the rotary member 102.

Figure 4:
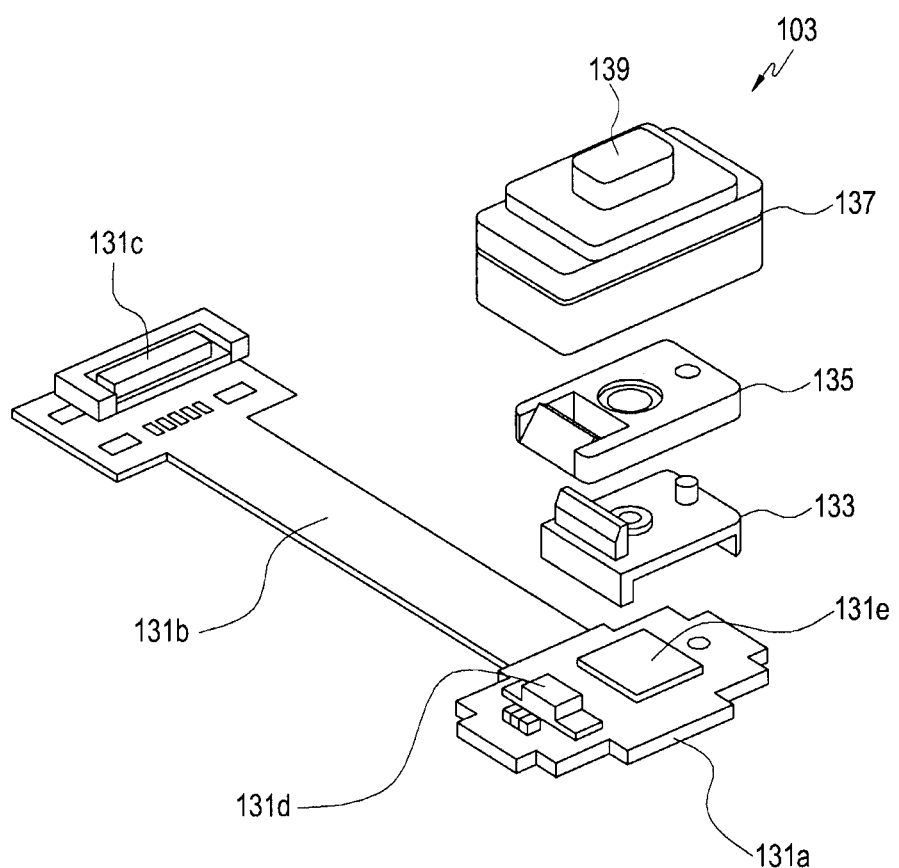
FIG. 4 is an exploded perspective view illustrating a sensor module of the electronic device according to various embodiments of the present disclosure.
Figure 5:
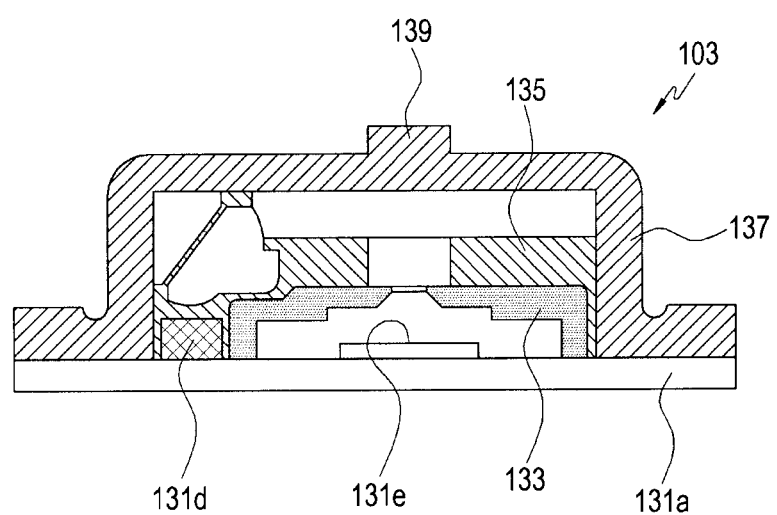
FIG. 5 is a sectional view illustrating the sensor module of the electronic device according to various embodiments of the present disclosure.

FIG. 4 is an exploded perspective view illustrating the sensor module 103 of an electronic device 100 according to various embodiments of the present disclosure. FIG. 5 is a sectional view illustrating the sensor module 103 of an electronic device 100 according to various embodiments of the present disclosure.

Referring to FIGS. 4 and 5, the sensor module 103 may include an optical sensor. For example, the sensor module 103 may include a light emission element 131d and a light reception element 131e. A displacement (e.g., a rotated angle) of an external object (e.g., the rotary member 102) in relation to the sensor module 103 may be detected according to light intensity information detected through the light reception element 131e (e.g., pixel data (e.g., raw data and/or absolute value data).

The sensor module 103 may include a circuit board 131a on which the light emission element 131d and the light reception element 131e are mounted, a connection member 131b (e.g., a flexible printed circuit board) extending from the circuit board 131a, and a connector 131c provided at an end of the connection member 131b. When the circuit board 131a is mounted on the main body 101 to correspond to the sensor hole 115, the connection member 131b is disposed inside the main body 101, and the connector 131c may be coupled to a main circuit board (not illustrated) accommodated within the main body 101. Since the light emission element 131d provides light, the light reception element 131e may easily detect pixel data (e.g., raw data and/or absolute value data) even in a dark environment. The light emission element 131d may include, for example, an infrared light emitting diode, and may project light in a grid pattern 121a (see, e.g., FIG. 6) and/or a detection surface 121b (see, e.g., FIG. 6) that is formed in at least a partial region of the rotary member 102. The light reception element 131e may include a photo diode, a C-MOS sensor, and a CCD sensor, and may sense light reflected from the grid pattern and/or the detection surface formed on the rotary member 102. In the case where the light reception element 131d includes a C-MOS sensor, the rotated angle of the rotary member 102 may be detected from the change of the pixel data (e.g., the raw data and/or absolute value data) detected from each pixel.

The sensor module 103 may further include a light shield member 133 disposed to enclose the light reception element 131e. The light shield member 133 may block an image or light from being introduced into the light reception element 131e in any other region or direction while providing a path to enable an image of a portion of the rotary member 102 at the position, which corresponds to the sensor module 103, to be introduced into the light reception element 131e.

For example, the sensor module 103 may further include a lens assembly 135 disposed on the light emission element 131d and the light reception element 131e. The lens assembly 135 may set a path that allows the light, which is emitted from the light emission element 131d, to proceed to a position corresponding to the sensor module 103 on the rotary member, and/or a path that allows the light, which is emitted from the light emission element 131d and reflected by the rotary member 102, to proceed to the light reception element 131e.

The sensor module 103 may improve the detection accuracy using the above-described light shield member 133 and lens assembly 135. For example, the light shield member 133 may exclude an environmental influence other than the light emitted from the light emission element 131d, and the lens assembly 135 may enable the light emitted from the light emission element 131d to proceed in a proper path. Accordingly, the sensor module 103 can detect the rotated angle of the rotary member 102 or the like more accurately.

For example, the sensor module 103 may further include a cover member 137 that accommodates at least one or all of the light emission element 131d, the light reception element 131e, the light shield member 133, and the lens assembly 135. The cover member 137 is opened in one face, and may be coupled to the circuit board 131a in the state in which the light emission element 131d or the like is accommodated therein, so that the circuit board 131a may be closed. A projection 139 may be formed on the other face of the cover member 137. The projection 139 may be formed to correspond to the sensor hole 115 to provide a means for fixing the sensor module 103.

The cover member 137 may be formed to be transparent in at least a portion (e.g., the projection 139 and a portion therearound) to transmit light. The light emitted from the light emission element 131d may proceed to the outside through the projection 139 by being guided by the lens assembly 135. The sensor hole 115 may be positioned to face the rotary member 102, and the light proceeding through the projection 139 can be reflected by the rotary member 102. The light reflected by the rotary member 102 may proceed to the inside of the sensor module 103 (e.g., the cover member 137) again through the projection 139, and may be introduced into the light reception element 131e by being guided by the lens assembly 135. The light reception element 131e may detect pixel data (e.g., raw data and/or image data) of a portion of the rotary member 102 from the light introduced thereto, and the sensor module 103 or the electronic device 100 may detect whether the rotary member 102 is rotated, the rotated direction of the rotary member 102, and/or the rotated angle of the rotary member 102 from the detected pixel data (e.g., the raw data and/or the image data) or the change in the pixel data.

The above-mentioned sensor module 103 may detect the pixel data (e.g., raw data and/or absolute value data) of a grid pattern 121a (see, e.g., FIG. 6) according to the rotated position of the rotary member 102. According to an embodiment, the pixel data (raw data and/or absolute value data) for the first region (e.g., the grid pattern 121a) may be differently detected depending on the rotation of the rotary member 102. For example, the sensor module 103 may detect the first region (e.g., the grid pattern 121a), or may detect the rotated angle of the rotary member 102 from the attribute information (e.g., pixel data) and/or a change of the attribute information detected from the first region (the grid pattern 121a).

Figure 6:
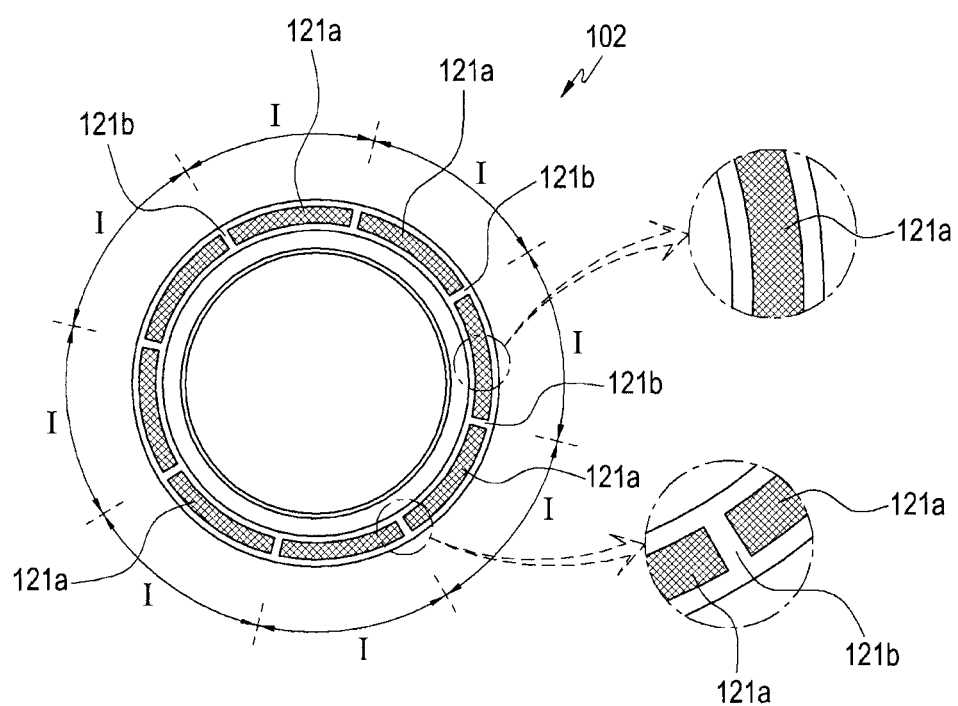
FIG. 6 is a plan view illustrating a rotary member of the electronic device according to various embodiments of the present disclosure.
Figure 7:
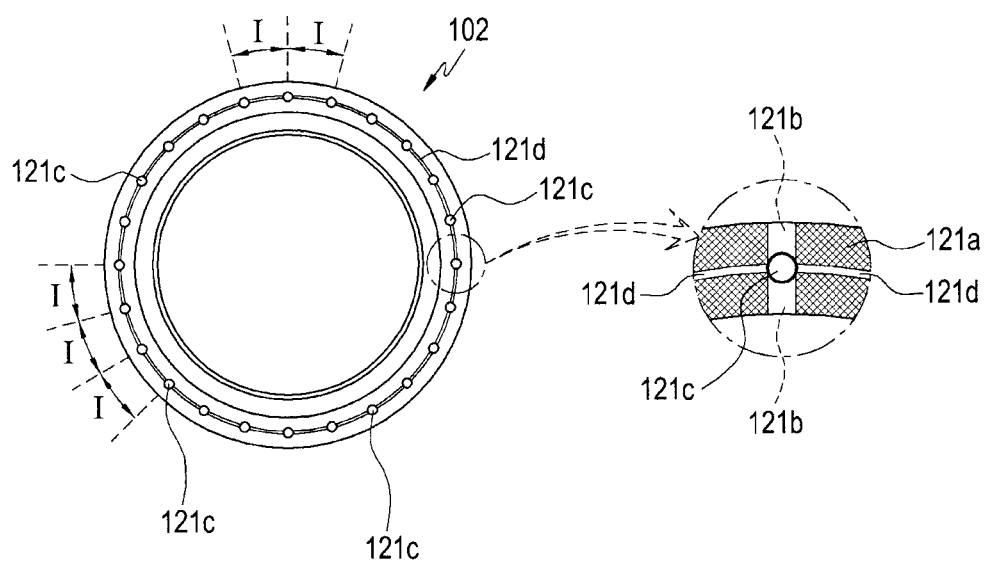
FIG. 7 is a plan view illustrating another exemplary rotary member of the electronic device according to various embodiments of the present disclosure.

FIG. 6 is a plan view illustrating the rotary member 102 of the electronic device 100 according to various embodiments of the present disclosure. FIG. 7 is a plan view illustrating another exemplary rotary member 102 of the electronic device 100 according to various embodiments of the present disclosure.

In order to make the sensor module 103 somewhat more easily detect the rotated angle of the rotary member 102 or the like, the rotary member 102 may include at least one of a first region (e.g., the grid pattern 121a), which corresponds to a first attribute (e.g., an optical attribute of a first range), and a second region (e.g., the detection surface(s) 121b and/or the recess(es) 121c), which corresponds to a second attribute (e.g., an optical attribute of a second range). For example, it may be easier for the sensor module 103 to detect the rotated angle of the rotary member 102 from the light reflected from one face or surface (or region thereof) of the rotary member 102, for example, because of patterns disposed thereon.

When the one face of the rotary member 102 is a simple flat surface, the pixel data (e.g., raw data and/or absolute value data) detected by the sensor module 103 (e.g., the light reception element 131e, such as a C-MOS sensor) may not be changed even if the rotary member 102 is rotated. When at least one of the first region (e.g., the grid pattern 121a) and the second region (e.g., the detection surface(s) 121b and the recess(es) 121c) is formed on the one face of the rotary member 102, the pixel data (e.g., raw data and/or absolute value data) detected by the sensor module 103 may be changed as the rotary member 102 is rotated. The sensor module 103 or the electronic device 100 may detect the rotated angle of the rotary member 102 or the like more easily from the detected pixel data and/or the change of the pixel data.

According to various embodiments, the first region (e.g., the grid pattern 121a), the second region (e.g., the detection surface(s) 121b and the recess(es) 121c) may be alternately arranged on the one face of the rotary member 102 along the rotating direction of the rotary member 102. According to one embodiment, the second region (e.g., the detection surface(s) 121b and/or the recess(es) 121c) may be arranged at each designated angle.

The attribute (e.g., the first attribute) of the first region (e.g., the grid pattern 121a) may be generated by, for example, pattern processing. The first region may include, by pattern processing, information based on various patterns (e.g., the number, size, and interval of patterns), a reflectivity, a color, a form according to an arrangement of protruding portions or recessed portions, or a combination thereof. The attribute (e.g., the second attribute) of the second region (e.g., the detection surface 121b) may be generated by, for example, pattern processing (mirror processing). In mirror processing the second region, the second region may also include information based on various patterns (e.g., the number, size, and interval of patterns), a reflectivity, a color, a form according to an arrangement of protruding portions or recessed portions, or a combination thereof. According to various embodiments, the above-mentioned attribute information may further include an arrangement of patterns, a shape of a protruding portion and/or a recessed portion, a color, or the like. The attribute of the first region and the attribute of the second region may have a difference that is greater than or equal to a predetermined value.

The sensor module 103 may detect pixel data owned by the first and second regions according to the rotation of the rotary member 102. The rotated angle and/or the rotated direction of the rotary member 102 may be detected from the attribute information and/or the change of the attribute information based on the detected pixel data. According to various embodiments, the sensor module 103 may detect and provide the attribute information and/or the change of the attribute information according to the rotation of the rotary member 102 to a control unit (e.g., a control unit 110 illustrated in FIG. 10) and/or a processor (e.g., a processor 21 illustrated in FIG. 12). The control unit and/or the processor may calculate the rotated angle and/or the rotated direction of the rotary member 102.

Referring to FIG. 6, the first region (e.g., the grid pattern 121a) may be formed on the one face or surface (or region thereof) of the rotary member 102, and may be formed along the circumferential direction (or rotating direction) of the rotary member 102. The first region (e.g., the grid pattern 121a) may be formed by dots or continued lines carved using a laser or the like. The first region (e.g., the grid pattern 121a) may be formed in a net-shaped pattern, and may be formed in a regular or irregular pattern that is formed by a combination of dots and lines.

The second region (e.g., the detection surface 121b) may be formed on the one face or region of the rotary member 102, and a plurality of such second regions may be formed alternately with the first regions (e.g., the grid patterns 121a) along the rotating direction of the rotary member 102. One or more second regions (e.g., the detection surfaces (121b)) may be formed, and in the case where two or more second regions are formed, the second regions may be arranged at a predetermined angular interval along the circumferential direction of the rotary member 102. The second region (e.g., the detection surface 121b) may be formed to reflect light in various ways. For example, the second region (e.g., the detection surface 121b) may be formed as a flat surface (e.g., a reflection surface), may be formed to absorb light using, for example, anti-reflection coating, or may be formed in a through-hole shape to transmit light.

When the rotary member 102 is mounted on the main body 101, a portion of one of the first region (e.g., the grid pattern 121a) and the second region (e.g., the detection surface(s) 121b) may be formed at a position where the light emitted from the light emission element 131d arrives. For example, the first region (e.g., the first grid pattern 121a) and the second regions (e.g., the detection surface(s) 121b may be alternately arranged along the trace where the light emitted from the light emission element 131d when the rotary member 102 is rotated on the main body 101. In one embodiment, when the rotary member 102 is rotated, the light reception element 131e may detect pixel data (e.g., raw data and/or absolute value data) corresponding to one of the first region (e.g., the grid pattern 121a) and the second region (e.g., the detection surface 121b).

Referring to FIG. 7, the first region (e.g., the grid pattern 121a) may be formed on the one face or surface or portion thereof of the rotary member 102, and may be arranged to form a generally circular ring shape.

A frictional recess 121d may be formed on the one face of the rotary member 102 along the trace according to the friction with the detents 127. The frictional recess 121d may be positioned within the region where the first region (e.g., the grid pattern 121a) is formed. The recess(es) 121c may have a shape recessed from the one face of the rotary member 102, or a shape of an opening (e.g., a hole) passing through the rotary member 102 According to one embodiment, the above-mentioned opening may be formed in the first region and/or the second region.

The recess(es) 121c may be deeper or wider than the frictional recess 121d as long as the recess(es) 121c has (have) a shape recessed from the one face of the rotary member 102. As the rotary member 102 is rotated, one of the recess 121c or two or more recesses 121c may be sequentially engaged with the detents 127 so as to generate a click feeling. According to various embodiments, Each of the recesses 121c may be positioned to correspond to one of the second regions (e.g., the detection surfaces 121b), for example, within the second region (e.g., the detection surface 121b). When each of the recesses 121c is formed in one of the second regions (e.g., the detection surfaces 121b), it may have the shape of a through-hole so as not to reflect light. For example, the second region (e.g., the detection surface 121b) may be formed as a reflection surface to reflect light, or a surface that absorbs or transmits light. According to various embodiments, the recesses 121c may be positioned within the region where the first region (e.g., the grid pattern 121a) to be irrelevant to, or independent from, the second regions (e.g., the detection surfaces 121b).

Figure 8:
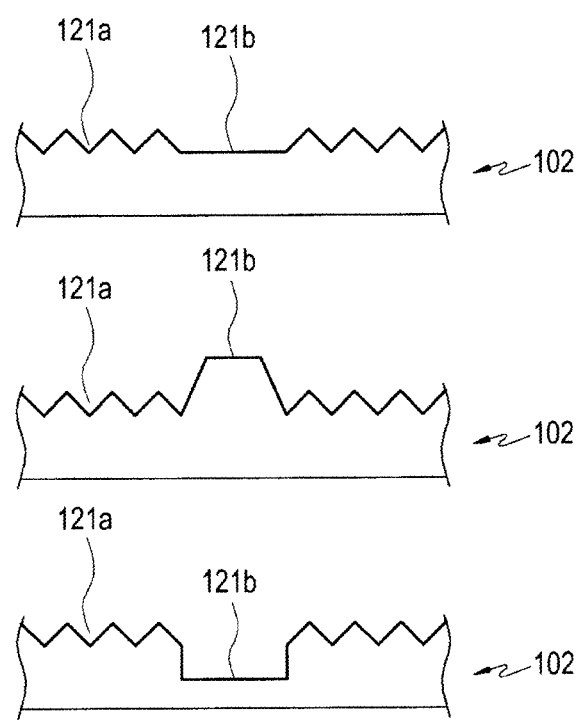
FIG. 8 illustrates sectional views illustrating various forms of rotary members of the electronic device according to various embodiments of the present disclosure.

FIG. 8 illustrates sectional views of various forms of the rotary member 102 of the electronic device 100 according to various embodiments of the present disclosure.

Referring to FIG. 8, the second region (e.g., the detection surface 121b) may be formed in various forms between adjacent first regions (e.g., the grid patterns 121a). For example, the second region (e.g., the detection surface 121b) may be formed in the form of a flat surface substantially at the same height of the first regions (e.g., the grid patterns 121a) or at the same height of a recessed portion or a protruding portion of the first regions (e.g., the grid patterns 121a). According to various embodiments, the second region (e.g., the detection surface 121b) may form a top end surface of a portion formed to be higher than the protruding portion of the first regions (e.g., the grid patterns 121a) or may be formed to be lower than the recessed portions of the first regions (e.g., the grid patterns 121a). The shape of the second region (e.g., the detection surface 121b) or a relative position in relation to the first region (e.g., the grid pattern 121a) may be variously set in consideration of a specification required for the electronic device 100, the mobility of the rotary member 102, the sensitivity of the sensor module 103b, and/or the like.

Hereinafter, schematic descriptions will be made on a configuration in which the sensor module 103 detects the rotated angle of the rotary member 102 in the case where a C-MOS sensor is used as the light reception element 131e.

Table 1 below represents pixel data (e.g., raw data) detected from any one point (e.g., referred to as a "subject region") of the rotary member 102 in the case where the C-MOS sensor used as the light reception element 131e has the resolution of 20 pixels by 20 pixels.

Each of the numbers indicated in Table 1 represent light intensity detected by each of the pixels of the light reception element 131e. For example, data of each of the pixels of the light reception element 131e may be expressed by "0" to "255" in which a number nearer to "0" may mean black and a number nearer to "255" may mean white. For example, the light detected by the pixel of "A" column, $2^{nd}$ row may be almost black, and the light detected by the pixel of "A" column, 21th row may be almost white. As the rotary member 102 is rotated, the subject region detected or photographed by the light reception element 131e may be varied. For example, the pixel data (e.g., raw data) of Table 1 is related to one portion of the rotary member 102 that is formed with the first region (e.g., the grid pattern 121a) or the like, and the pixel data (e.g., the raw data) detected through the light reception element 131e may be different from those of Table 1 as the subject region is varied (e.g., the rotary member 102 is rotated). When a rotating position of the rotary member 102 and row data corresponding thereto are stored, the electronic device 100 may compare the raw data of two points when the raw data at a first point on the rotary member 102 and the raw data at a second point on the rotary member 102 so as to detect the rotated angle of the rotary member 102.

If the deviation of raw data is small when one subject region is photographed, it may mean that a change, such as an indentation, is small (e.g., the subject region is flat). In one embodiment, if the deviation of raw data is small, it may mean that the change in color, the change in reflectivity, or the like within the subject region is small. When the subject region is positioned on the second region (e.g., the detection surface 121b), the deviation of the raw data detected from the light reception element 131e may be considerably lowered.

The deviation of raw data will be referred to as "image data" in a specific embodiment of the present disclosure. Base on the raw data as described above, the sensor module 103 or the electronic device 100 may detect or calculate image data through Equation 1 as follows:

$$\text{Image Data} = (|A2+C4-(C2+A4)| + |B2+D4-(D2+B4)| \ldots |R19+T21-(T19+R21)|)/16 \quad \text{Equation 1}$$

In Equation 1, capital letters in the English alphabet refer to "columns" in Table 1, respectively, and numbers indicated with the capital letters may refer to "rows" in Table 1, respectively. In Equation 1, "Image Data" refer to a value obtained by converting deviations among pixels selected according to a prescribed rule into absolute values, calculating the sum of the converted absolute values, and then dividing the sum by constant "16."

TABLE 1

|    | A   | B  | C  | D  | E  | F  | G  | H  | I  | J  | K  | L | M | N | O | P | Q | R | S | T |
|----|-----|----|----|----|----|----|----|----|----|----|----|---|---|---|---|---|---|---|---|---|
| 1  |     |    |    |    |    |    |    |    | Image |  |  |  |  |  |  |  |  |  |  |  |
| 2  | 2   | 3  | 2  | 2  | 3  | 3  | 2  | 3  | 4  | 3  | 4  | 4 | 5 | 4 | 3 | 3 | 4 | 5 | 6 | 5 |
| 3  | 3   | 3  | 3  | 2  | 3  | 3  | 3  | 5  | 4  | 5  | 5  | 5 | 5 | 4 | 4 | 4 | 4 | 4 | 4 | 4 |
| 4  | 3   | 3  | 4  | 3  | 4  | 4  | 5  | 6  | 5  | 6  | 5  | 4 | 4 | 5 | 5 | 5 | 6 | 5 | 4 | 4 |
| 5  | 3   | 3  | 4  | 6  | 6  | 6  | 6  | 6  | 5  | 5  | 5  | 5 | 4 | 4 | 5 | 4 | 4 | 4 | 4 | 3 |
| 6  | 3   | 5  | 8  | 8  | 7  | 6  | 7  | 5  | 5  | 5  | 5  | 4 | 5 | 4 | 4 | 5 | 4 | 4 | 3 | 4 |
| 7  | 4   | 9  | 12 | 8  | 7  | 7  | 6  | 6  | 5  | 5  | 5  | 4 | 4 | 4 | 4 | 4 | 4 | 4 | 4 | 3 |
| 8  | 13  | 14 | 10 | 9  | 8  | 7  | 6  | 5  | 6  | 6  | 6  | 5 | 5 | 4 | 4 | 4 | 4 | 4 | 4 | 5 |
| 9  | 18  | 13 | 11 | 11 | 9  | 8  | 6  | 6  | 6  | 6  | 5  | 5 | 4 | 3 | 4 | 4 | 3 | 4 | 5 | 5 |
| 10 | 19  | 16 | 15 | 14 | 10 | 9  | 8  | 6  | 6  | 7  | 5  | 5 | 4 | 5 | 5 | 4 | 4 | 3 | 3 | 5 |
| 11 | 17  | 20 | 21 | 16 | 10 | 9  | 8  | 6  | 7  | 5  | 6  | 5 | 4 | 4 | 4 | 4 | 4 | 4 | 4 | 4 |
| 12 | 21  | 24 | 28 | 17 | 11 | 9  | 8  | 8  | 7  | 6  | 6  | 6 | 5 | 4 | 5 | 5 | 5 | 4 | 4 | 4 |
| 13 | 20  | 22 | 20 | 15 | 11 | 9  | 9  | 8  | 9  | 8  | 7  | 7 | 6 | 6 | 7 | 7 | 5 | 5 | 5 | 4 |
| 14 | 18  | 22 | 17 | 15 | 12 | 10 | 11 | 12 | 11 | 10 | 8  | 6 | 7 | 8 | 8 | 9 | 6 | 5 | 5 | 4 |
| 15 | 24  | 24 | 18 | 15 | 12 | 10 | 10 | 11 | 11 | 10 | 9  | 8 | 7 | 8 | 8 | 8 | 6 | 6 | 5 | 4 |
| 16 | 31  | 26 | 19 | 16 | 12 | 11 | 10 | 9  | 8  | 9  | 8  | 7 | 6 | 7 | 6 | 6 | 6 | 5 | 5 | 4 |
| 17 | 42  | 32 | 25 | 18 | 15 | 12 | 11 | 10 | 8  | 9  | 7  | 7 | 6 | 6 | 6 | 5 | 5 | 5 | 4 | 4 |
| 18 | 63  | 44 | 37 | 26 | 21 | 18 | 13 | 10 | 8  | 8  | 7  | 7 | 6 | 6 | 5 | 5 | 5 | 4 | 4 | 5 |
| 19 | 97  | 67 | 53 | 41 | 28 | 22 | 13 | 9  | 7  | 7  | 7  | 6 | 6 | 5 | 5 | 6 | 5 | 5 | 4 | 5 |
| 20 | 158 | 90 | 65 | 47 | 31 | 21 | 12 | 9  | 7  | 6  | 7  | 7 | 6 | 5 | 6 | 5 | 5 | 5 | 4 | 5 |
| 21 | 141 | 89 | 66 | 42 | 26 | 16 | 11 | 9  | 7  | 7  | 6  | 6 | 5 | 5 | 5 | 5 | 5 | 4 | 4 | 4 |

Figure 9:
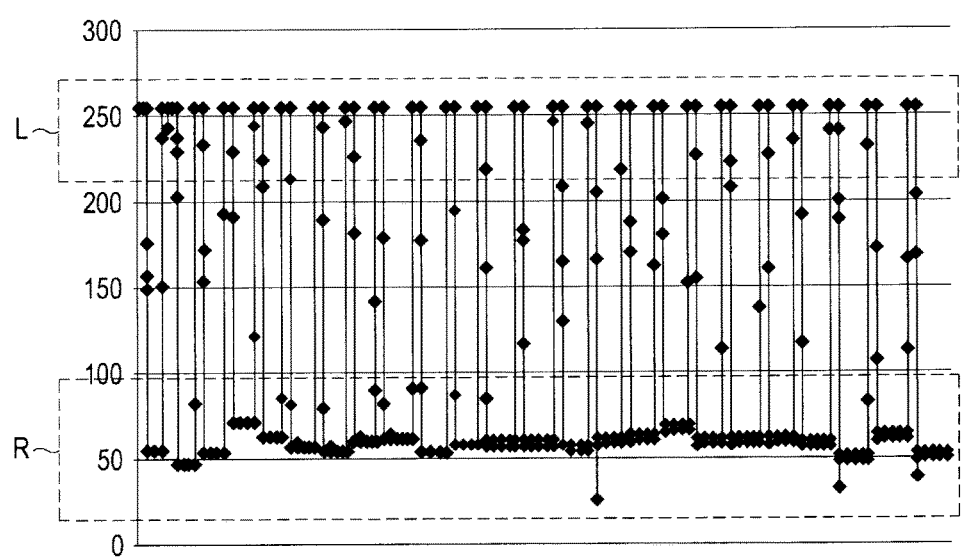
FIG. 9 is a graph for describing image data appearing through a rotary member of an electronic device according to various embodiments of the present disclosure.

FIG. 9 is a graph for describing image data appearing through the rotary member 102 of the electronic device 100 according to various embodiments of the present disclosure.

FIG. 9 is a graph representing image data calculated through Equation 1 from raw data of a subject region detected according to the rotation of the rotary member 102. In FIG. 9, a low image data region R, which is lower than, for example, "100," may mean that the deviations of raw data detected from respective pixels in a subject region are small. For example, a portion of the second region (e.g., the detection surface 121b) formed of a reflection surface is positioned within the subject region, the raw data detected from respective pixels may have a value close to "255," and when almost all the pixels detect data close to "255," the deviations of raw data may be lowered. According to various embodiments, when a portion of the second region (e.g., the detection surface 121b), which absorbs or transmits light, is positioned within the subject region, the raw data detected from respective pixels may have a value close to "0," and when almost all the pixels detect data close to "0," the deviations of raw data may be lowered.

In FIG. 9, a high image data region R, which is higher than, for example, "200," may mean that the deviations of raw data detected from respective pixels are large. When a portion of the first region (e.g., the grid pattern 121a) formed by, for example, laser carving is positioned in the subject region, raw data detected from respective pixels may appear variously (e.g., as indicated in Table 1). Accordingly, the deviations of image data (e.g., raw data calculated through Equation 1) may increase.

Table 2 below represents values converted according to a prescribed rule from the pixel data (e.g., raw data) of Table 1 (hereinafter, the converted values will be referred to as "absolute value data"). For example, the absolute value of a value obtained by subtracting the sum of "C2" and "A4" from the sum of "A2" and "C4" is indicated at "B44" in Table 2. For example, the absolute value of a value obtained by subtracting the sum of "D2" and "F4" from the sum of "D2" and "F4" is indicated at "D44" in Table 2. The above-mentioned image data can be calculated by dividing the sum of absolute value data, which are obtained by converting raw data according to the rotation of the rotary member 102 as described above, by constant "16." In the case where rotated positions of the rotary member and pixel data according to the rotated positions (e.g., raw data and/or absolute value data) are stored, when the pixel data (e.g., raw data and/or absolute value data) at a first point on the rotary member 102 and the pixel data (e.g., raw data and/or absolute value data) at a second point are detected, the electronic device 100 can calculate the rotated angle of the rotary member 102 by comparing the pixel data (e.g., raw data and/or absolute value data) of the two points.

TABLE 2

|    | A  | B  | C  | D  | E  | F  | G | H | I | J | K | L | M | N | O | P | Q | R | S | T |
|----|----|----|----|----|----|----|---|---|---|---|---|---|---|---|---|---|---|---|---|---|
| 43 |    |    |    |    |    |    |   |   |   | Absolute BPF |   |   |   |   |   |   |   |   |   |   |
| 44 |    | 1  | 1  | 1  | 0  | 2  | 2 | 2 | 0 | 0 | 3 | 2 | 1 | 3 | 1 | 0 | 2 | 4 | 1 |   |
| 45 |    | 1  | 4  | 2  | 1  | 0  | 2 | 2 | 1 | 1 | 0 | 1 | 0 | 2 | 0 | 1 | 0 | 0 | 1 |   |
| 46 |    | 4  | 3  | 1  | 3  | 1  | 3 | 2 | 0 | 0 | 1 | 1 | 1 | 2 | 1 | 1 | 1 | 1 | 1 |   |
| 47 |    | 7  | 4  | 7  | 1  | 1  | 1 | 0 | 0 | 0 | 1 | 0 | 1 | 1 | 0 | 1 | 0 | 0 | 0 |   |
| 48 |    | 8  | 8  | 1  | 0  | 2  | 1 | 2 | 1 | 0 | 0 | 1 | 1 | 0 | 1 | 0 | 1 | 1 | 1 |   |
| 49 |    | 15 | 1  | 3  | 2  | 2  | 1 | 1 | 1 | 1 | 0 | 0 | 2 | 0 | 1 | 1 | 0 | 2 | 2 |   |
| 50 |    | 1  | 3  | 3  | 3  | 0  | 1 | 2 | 0 | 1 | 1 | 0 | 1 | 2 | 1 | 1 | 1 | 1 | 1 |   |
| 51 |    | 11 | 2  | 9  | 4  | 1  | 1 | 1 | 1 | 0 | 1 | 1 | 1 | 0 | 1 | 1 | 0 | 2 | 1 |   |
| 52 |    | 11 | 5  | 12 | 3  | 1  | 2 | 1 | 3 | 0 | 2 | 0 | 2 | 1 | 2 | 1 | 0 | 0 | 2 |   |
| 53 |    | 4  | 3  | 2  | 1  | 0  | 2 | 1 | 1 | 1 | 1 | 1 | 0 | 1 | 1 | 2 | 2 | 0 | 1 |   |
| 54 |    | 8  | 0  | 12 | 3  | 2  | 3 | 1 | 0 | 2 | 4 | 0 | 4 | 1 | 0 | 2 | 3 | 0 | 1 |   |
| 55 |    | 6  | 2  | 3  | 1  | 0  | 2 | 1 | 1 | 0 | 1 | 1 | 1 | 0 | 1 | 0 | 0 | 1 | 1 |   |
| 56 |    | 11 | 3  | 2  | 0  | 1  | 4 | 2 | 2 | 3 | 2 | 1 | 2 | 1 | 2 | 2 | 3 | 0 | 0 |   |
| 57 |    | 11 | 5  | 4  | 1  | 2  | 3 | 4 | 0 | 1 | 0 | 1 | 1 | 1 | 1 | 1 | 2 | 0 | 1 |   |
| 58 |    | 14 | 8  | 9  | 3  | 6  | 6 | 3 | 2 | 1 | 1 | 1 | 1 | 1 | 0 | 0 | 0 | 0 | 2 |   |
| 59 |    | 27 | 12 | 15 | 13 | 11 | 11 | 3 | 1 | 1 | 1 | 0 | 0 | 1 | 2 | 1 | 1 | 0 | 1 |   |
| 60 |    | 67 | 25 | 18 | 18 | 11 | 4 | 0 | 1 | 1 | 2 | 0 | 1 | 1 | 1 | 1 | 1 | 0 | 1 |   |
| 61 |    | 31 | 21 | 15 | 7  | 0  | 6 | 2 | 0 | 1 | 0 | 0 | 0 | 1 | 1 | 0 | 0 | 0 | 0 |   |

Pixel data (e.g., raw data and/or absolute value data) according to rotated positions of the rotary member 102 may be obtained through photographing at predetermined angular intervals. The pixel data may be stored in the sensor module 103 or the electronic device 100 (or a memory embedded in the electronic device 100). Stored pixel data (e.g., raw data and/or absolute value data) may provide reference value set(s) to be compared with pixel data that are detected when the rotary member 102 is rotated. For example, the rotated angle and/or rotated direction of the rotary member 102 may be judged and determined based on the number of times in which the pixel data (e.g., raw data and/or absolute value data) detected by the sensor module 103 while the rotary member 102 is rotated and the reference value set(s) stored in the electronic device 100 coincide with each other. Alternatively, the rotated angle and/or rotated direction of the rotary member 102 may be judged and determined by comparing the reference value set, which may coincide with pixel data at the time point when the rotary member 102 starts to rotate and the reference value set, which coincides with pixel data at the time point when the rotation of the rotary member 102 is stopped.

According to various embodiments, one second region (e.g., the detection surface 121b) may be formed, or two or more second regions (e.g., the detection surfaces 121b) may be formed. As the sensor module 103 detects the second region(s) (e.g., the detection surface(s) 121b), the detected rotated angle of the rotary member 102 can be corrected. For example, in the case where only one second region (e.g., the detection surface 121b) is formed, when the rotary member 102 is rotated in one direction such that the second region (e.g., the detection surface 121b) is repeatedly detected, it may mean that the rotary member 102 has been rotated by the angle of 360 degrees. The rotated angle of the rotary member 102, which is calculated based on raw data or the like, may be differently detected. For example, an error may occur in the detecting operation of the sensor module 103 due to a manufacturing tolerance or an assembly tolerance of the main body 101, the rotary member 102, and the sensor module 103, wear and tear caused according to repeated rotation, or a pixel data processing error. According to various embodiments of the present disclosure, the electronic device 100 may determine the rotated angle of the rotary member 102 by taking the detection position of the second region (e.g., the detection surface 121*b*) prior to the pixel data or reference value sets when the second region (e.g., the detection surface 121*b*) is detected. For example, when the second regions (e.g., the detection surfaces 121*b*) are detected, the rotated angle of the rotary member 102 may be determined as corresponding to the angular interval where the second regions (e.g., the detection surfaces 121*b*) are arranged.

According to various embodiments, two or more second regions (e.g., the detection surfaces 121*b*) may be arranged on one face or surface (or portion thereof) of the rotary member 102 at predetermined intervals, e.g., at every designated angle. When two adjacent second regions (e.g., the detection surfaces 121*b*) with one first region (e.g., the grid pattern 121*a*) being interposed therebetween are detected through the above-mentioned light reception element 131*e*, the electronic device 100 can correct the rotated angle of the rotary member 102 with the angular interval where the two second regions (e.g., the detection surfaces 121*b*) are formed.

According to various embodiments, the detection or correction of the rotated angle of the above-mentioned rotary member 102 may be performed in combination with the detents 127. For example, when the recesses 121*c* are formed at the angular interval of 15 degrees, the rotated angle may be detected based on the raw data or the like detected by the sensor module while a region where the first region (e.g., the grid pattern 121*a*) is formed is detected, and the rotated angle of the rotary member 102 may be determined as the angle of 15 degrees prior to the rotated angle detected by the sensor module 103 when the detents 127 are engaged with one of the recesses 121*c*.

A method of calculating and correcting a rotated angle as described above will be described in detail with reference to FIG. 11.

Figure 10:
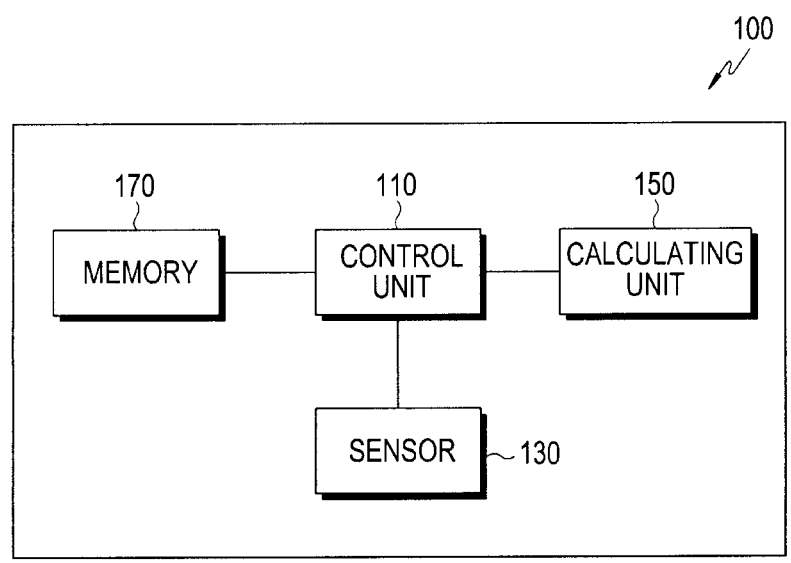
FIG. 10 is a block diagram illustrating an electronic device according to various embodiments of the present disclosure.

FIG. 10 is a block diagram illustrating an electronic device 100 according to various embodiments of the present disclosure.

Referring to FIG. 10, the electronic device 100 may include a control unit 110, a sensor 130, a calculating unit 150, and a memory 170, and the sensor 130 may include the sensor module of the above-described embodiment (e.g., the sensor module 103 illustrated in FIG. 4).

According to various embodiments, one or more reference value sets, which may correspond to light intensity information (e.g., pixel data) detected through the light reception element (e.g., the light reception element 131*e* of FIG. 4) may be stored in the memory 170. The control unit 110 and/or the processor 21 to be described later may determine the light intensity information based on attribute information and/or a change in the attribute information detected through the light reception element when the rotary member 102 is rotated. The control unit 110 and/or the processor 21 to be described later may judge and determine the rotated angle and/or rotated angle of the rotary member 102 by comparing the determined light intensity information and the reference value set(s).

According to various embodiments, the sensor 130 (e.g., the sensor module 103 illustrated in FIG. 4) may detect pixel data (e.g., raw data and/or absolute value data) related to the rotated angle of the above-mentioned rotary member 102 and/or a change in the pixel data, and may transmit the pixel data and/or change in the pixel data to the control unit 110. The control unit 110 may provide information related to the received pixel data and/or change in the pixel data to the calculating unit 150. The calculating unit 150 may calculate the rotated angle of the rotary member 102 from the received information, and may transmit the rotated angle to the control unit 110. In one embodiment, the rotated angle of the rotary member 102 may be calculated by comparing the information received by the calculating unit 150 and the above-described reference value set(s). The control unit 110 may generate an input signal (e.g., changing a user interface) or store the input signal in the memory 170 based on the calculated rotated angle.

According to one embodiment, the pixel data detected through the sensor 103 (e.g., the sensor module 103 illustrated in FIG. 4) and/or a change in the pixel data may be provided to the calculating unit 150 through the control unit 110, and at the same time, may be stored in the memory 170. The control unit 110 and/or the calculating unit 150 may determine and calculate the rotated angle of the rotary member of the rotary member 102 by comparing the pixel data or the like stored in the memory 170 with the pixel data detected according to the rotation of the rotary member 102, and may generate an input signal according to the rotated angle.

According to various embodiments, the calculating unit 150 and/or the memory 170 may be integrated with the control unit 110. For example, the sensor 130 (e.g., the sensor module 103 illustrated in FIG. 4) may detect pixel data (e.g., raw data and/or absolute value data) related to the rotated angle of the above-mentioned rotary member 102 and/or a change in the pixel data, and may transmit the pixel data and/or change in the pixel data to the control unit 110. The control unit 110 may calculate the rotated angle of the rotary member 102 from the received pixel data and/or the change in the pixel data. The control unit 110 may generate an input signal corresponding to the rotated angle or may store the calculated rotated angle.

According to various embodiments, the calculating unit 150 and/or the memory 170 may be integrated with the sensor 130 (e.g., the sensor module 103 illustrated in FIG. 4) in detecting the rotated angle of the rotary member 102. For example, the sensor 130 may detect pixel data (e.g., raw data and/or absolute value data) related to the rotated angle of the above-mentioned rotary member 102 and/or a change in the pixel data, and at the same time, may calculate the rotated angle of the rotary member 102 from the detected pixel data and/or change in the pixel data. The sensor 130 may store the calculated rotated angle or may transmit the calculated rotated angle to the control unit 110. The control unit 110 may generate an input signal based on the rotated angle provided from the sensor 130.

In describing the present embodiment, an example is disclosed in which the rotated angle of the rotary member 102 is calculated based on the information detected from the sensor 130 (e.g., the sensor module 103 illustrated in FIG. 4), but the present disclosure is not necessarily limited thereto. For example, when a plurality of recesses (e.g., the above-mentioned recesses 121*c*) are formed on the rotary member 102 and a detent (e.g., the above-mentioned detent 127) is provided on the main body 101, the rotated angle of the rotary member 102 may be calculated based on the number of positions or times where the detent is engaged in the recesses. For example, in the state in which one detent is engaged in one recess in a structure in which recesses are formed on the rotary member 102 at 15-degree intervals, if the detent is engaged in another adjacent recess, it can be seen that the rotary member 102 is rotated by 15 degrees. According to various embodiments, the rotated angle of the rotary member 102 may be calculated by combining the information detected from the sensor 130 and the number of positions or times where the detent is engaged in the recesses.

The transmission and utilization of the above-mentioned information (e.g., pixel data including raw data and/or absolute value data) may be implemented through other various embodiments without the necessity of being limited to the above-described embodiments. Further detailed descriptions related to the transmission and utilization of the information item(s) detected from the sensor 130 (e.g., the sensor module 103 illustrated in FIG. 4) will be omitted to avoid obfuscating the present disclosure in unnecessary detail.

Even if rotary type input devices (e.g., input devices each including the above-mentioned rotary member 102 and the sensor module 103) are manufactured in the same specification and through the same processes, the rotated angles of the rotary members 102 may be differently detected in respective products (e.g., each of the above-described electronic devices 100) or depending on the periods of use of respective products for example, because of different manufacturing tolerances, assembly states, as well as, differences in wear and tear states due to repeated rotations, non-uniform wear and tear according to a user's habit, or a processing error of pixel data in the rotary members 102 or the housings 111 of the main bodies 101.

Descriptions will be made on a method of calculating the rotated angle of the rotary member 102 by correcting a difference in detected rotated angles with reference to FIG. 11.

Figure 11:
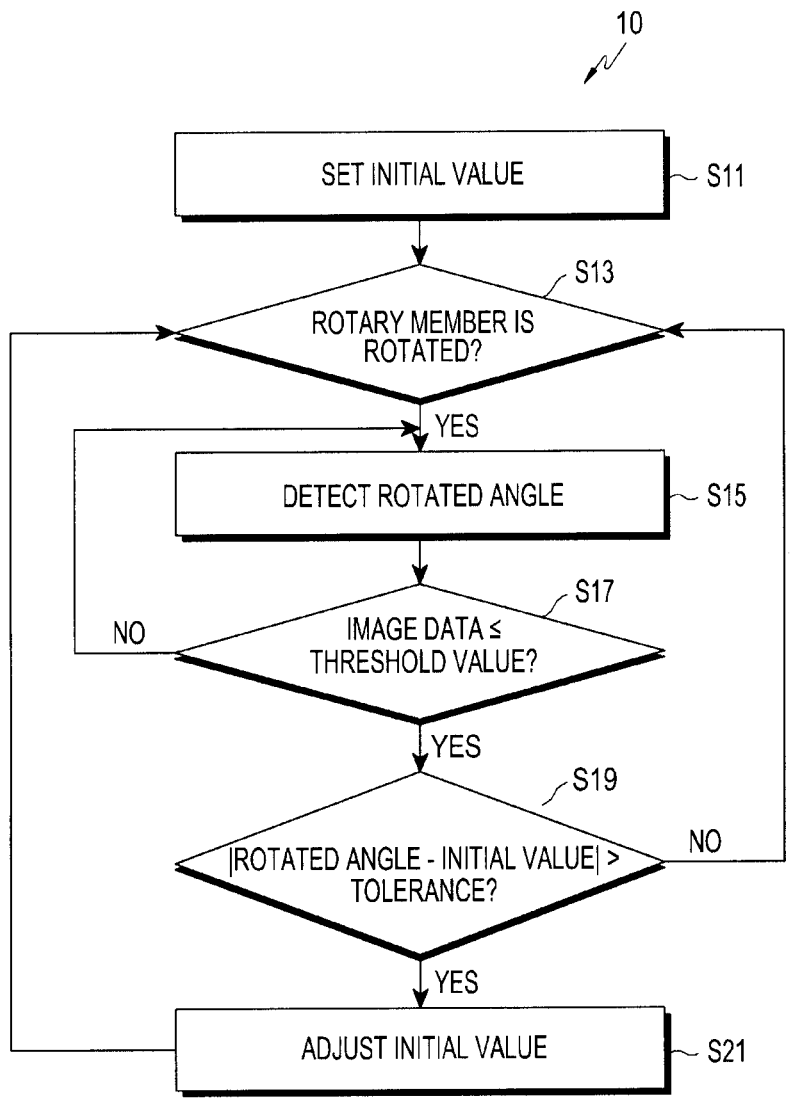
FIG. 11 is a flowchart for describing a method of calculating a rotated angle of a rotary member in an electronic device according to one of various embodiments of the present disclosure.

FIG. 11 is a flowchart for describing a method 10 of calculating a rotated angle of a rotary member 102 in an electronic device 100 according to one of various embodiments of the present disclosure.

The method 10 of calculating the rotated angle of the rotary member 102 may include an operation of setting an initial value (S11), an operation of detecting the rotated angle of the rotary member 102 (S15), an operation of comparing the detected rotated angle with the initial value (S19), and an operation of correcting the initial value according to a comparison result of the detected rotated angle and the initial value (S21).

The operation of setting the initial value (S11) is an operation to be executed through the above-mentioned control unit 110, and may set an initial value that corresponds to each section in which the rotary member 102 is rotated (see FIG. 6 or FIG. 7) (hereinafter, referred to as a "set rotary section" or a "set section").

The set rotary section I may be set by dividing an entire angle range in which the rotary member 102 is rotated or an angle range in which the rotary member 102 is rotated into a plurality of sections. For example, the set rotary section I may be set by the second region (e.g., the detection surface 121b) (or the above-mentioned recess). When the rotary member 102 is freely rotatable regardless of a direction and only one (1) second region (e.g., the detection surface 121b) is formed, the set rotary section I may be set as the angle range of 360 degrees (i.e., the rotary member 102 may be rotated along its entire circumference). When the rotary member 102 is freely rotatable regardless of the direction and twenty four (24) second regions (e.g., the detection surfaces 121b) are formed, the set rotary section I may be set as the angle range of 15 degrees.

The initial value may mean the number of information items for a subject region (e.g., the above-mentioned reference value set(s)), which can be acquired by the sensor 130 (e.g., the sensor module 103 illustrated in FIG. 4) according to the rotated position of the rotary member 102 in the set rotary section I. For example, the electronic device 100 (e.g., the above-mentioned control unit 110) may detect each of the pixel data for a subject region (e.g., the first region (e.g., the grip pattern 121a)) at one-degree angular intervals in the rotating direction of the rotary member 102. Each of the pixel data may be stored in the memory 170. For example, pixel data for a plurality of points may be set as reference value sets to correspond to light intensity information detected by the above-mentioned light reception element (e.g., the light reception element 131e illustrated in FIG. 4), and may be set in the above-mentioned memory 170. The number of points corresponding to the stored reference value sets may be set at the initial value.

For example, when the subject information is detected at one-degree angular intervals in the set section I in the angular range of 15 degrees, 15 reference value sets may be set in the memory 170, and the above-mentioned control unit 110 may set the initial value for the set rotary section I as "15 counts." When the set rotary section I has an angle of 15 degrees and the information of the subject region is stored at 1.5-degree angular intervals, the above-mentioned control unit 110 may set the initial value for the set rotary section I as "10 counts." The control unit 110 may variously set the initial value depending on the angle of the set rotary section I and the angular intervals for detecting the information of the subject region. The set rotary section I or the initial value may be properly set in consideration of the precision of an input device or the like in manufacturing a practical electronic device.

When the rotating range of the rotary member 102 is divided into a plurality of set sections I, the respective set sections I may have the same angular range or different angular ranges. According to various embodiments, even if the set rotary sections I have the same angular range, the initial values, which correspond to the set rotary sections I, respectively, may be different from each other. In a certain embodiment, a plurality of set sections I, which have different angular ranges, may have the same initial values. For example, the set section(s) I for the rotary member 102 and the initial value(s) corresponding thereto may be variously designed in consideration of an input operation using the rotary member 102, a mode, or the like.

According to one embodiment, the electronic device 100 (e.g., the sensor 130) may normally monitor whether the rotary member 102 has been rotated or not (S13). In addition, when the rotation of the rotary member 102 is sensed, the electronic device 100 (e.g., the sensor 130) may detect the rotated angle by using the sensor module 103 or the detent 127.

The operation of detecting the rotated angle of the rotary member 102 (S15) is an operation that is executed by the above-mentioned sensor 130, the control unit 110, and/or the calculating unit 150, in which the rotated angle of the rotated angle 102 during the rotation may be detected. The sensor 130 (e.g., the sensor module 103 of FIG. 4) may detect the attribute information provided by the first region (e.g., the grid pattern 121a) and/or a change in the attribute information by using an optical sensor (e.g., a C-MOS sensor), and may generate pixel data (e.g., raw data and/or absolute value data). The pixel data and/or the light intensity information detected or generated by the sensor 130 (e.g., the sensor module 103 illustrated in FIG. 4) may be transmitted to the control unit 110. The control unit 110 and/or the calculating unit 150 may determine the rotated angle and/or the rotated direction of the rotary member 102 by comparing the received pixel data (and/or light intensity information) with the reference value set(s) stored in the memory 170.

The electronic device 100 (e.g., the control unit 110) may determine whether the second region (e.g., the detection surface 121b) has been detected when the rotary member 102 is rotated (S17). For example, when the first region (e.g. the grid pattern 121a) is detected, the image data of the subject region may appear as a predetermined number or more (e.g., "150", "200" or more). In one embodiment, when the second region (e.g., the detection surface 121b) is detected, the image data may appear not to exceed a threshold value. The threshold value may be determined by comparing image data for each of the second regions (e.g., the detection surface 121b) of a practically manufactured rotary member 102 and the image data in the region where the first region (e.g., the grid pattern 121a) is formed. As exemplified in an above-described embodiment, the lower image data region R appears as "100" or less.

When the second region (e.g., the detection surface 121b) is not detected, the electronic device 100 (e.g., the control unit 110) may continuously monitor whether the rotary member 102 is rotated or may continuously detect the rotated angle of the rotary member 102. For example, the sensor 130 (e.g., the sensor module 103 of FIG. 4) may repeatedly (periodically) or continuously detect information for the subject region on the rotary member 102. According to various embodiments, even if the second region (e.g., the detection surface 121b) is detected, the electronic device 100 may continuously detect the angle by which the rotary member 102 is rotated. For example, regardless whether the second region (e.g., the detection surface 121b) is detected, for example, the sensor module 103 may continuously detect the rotated angle of the rotary member 102.

The operation of comparing the detected rotated angle with the initial value (S19) is an operation executed by the control unit 110, in which light intensity information detected when the rotated angle 102 is rotated through the set section I (e.g., a calculated value corresponding to a change in the pixel data) and the initial value of the corresponding set section I may be compared to one another. When the second region (e.g., the detection surface 121b) is repeatedly detected (e.g., continuously twice), the control unit 110 may determine that the rotary member 102 is rotated by the set section I. Here, the "calculated value" may mean a number that coincides with reference value set(s) in the light intensity information (e.g., pixel data) corresponding to the subject region.

According to various embodiments, while the rotary member 102 is rotated through the set section I in which the initial value is set as "15 counts," the calculated value corresponding to the detected light intensity information (e.g., pixel data) may be "15 counts." As described above, the calculated value may be different from the initial value according to the manufacturing tolerance, assembly state, and the wear and tear state of the rotary member 102. For example, when the first region (e.g., the grid pattern 121a) is damaged such that it is different than it was at the initial value setting time or the rotary member 102 is worn, information for a portion of the subject region may be changed. When information of a portion of the subject region to be detected while the rotary member 102 is rotated through the set section, the calculated value for the detected rotated angle may be lower than "15 counts."

In the operation of comparing the detected rotated angle with the initial value (S19), when it is determined that a difference between the calculated value in the state in which the rotary member 102 has been rotated through the set section I and the initial value (or the absolute value of the difference) is within a tolerance, the electronic device 100 (e.g., the control unit 110) may monitor whether the rotary member 102 is rotated (S13), or may perform the operation of detecting the rotated angle (S15) in the state in which the previously set initial value is maintained. According to various embodiments, even if it is determined that the difference between the calculated value and the initial value is within the tolerance, the electronic device 100 (e.g., the control unit 110) may perform the operation of correcting the initial value (S21). In the correcting operation (S21), the electronic device 100 (e.g., the control unit 110) may monitor whether the rotary member 102 is rotated (S13) or may perform the operation of detecting the rotated angle (S15) in the state in which the previously set initial value is maintained. According to various embodiments, in the operation of comparing the detected rotated angle with the initial angle (S19), when it is determined that the detected rotated angle and the initial value are equal to each other, the electronic device 100 (e.g., the control unit 110) may maintain the initial value, and when it is determined that the detected rotated angle and the initial value are different from each other, the electronic device 100 (e.g., the control unit 110) may set the detected rotated angle as a new initial value.

The operation of correcting the initial value (S21) is an operation executed by, for example, the control unit 110, in which, when the difference between the calculated value and the initial value exceeds a tolerance, the initial value may be reset to correspond to the calculated value. For example, when the calculated value for the rotated angle, which is detected after the rotary member 102 has been rotated through a rotary section in which the initial value was set to "15 counts," is "12 counts," the electronic device 100 may change the previously set initial value to "12 counts." The tolerance for determining whether to correct the previously set initial value may be variously set depending on the size of the electronic device, the sensitivity of the sensor module, the form of the grid, and/or the like. When the initial value is reset to correspond to the calculated value, the control unit 110 may delete the already stored reference value set(s), and may store the reference value set(s) corresponding to the reset initial value in the memory 170.

According to various embodiments, the second region may be arranged on one face of the rotary member 102 at every designated angle. In one embodiment, in the case where the detected light intensity information corresponds to the second attribute, the control unit 110 and/or a processor 21 to be described later may be set to correct the rotated angle or the rotated direction of the rotary member 102 to an angle where the second region is disposed.

The correction for the previously set initial value may be performed whenever the rotary member 102 is rotated through the corresponding set section I. For example, the electronic device 100 may correct the previously set initial value to the calculated value corresponding to the light intensity information that is detected when the rotary member 102 has been rotated through the corresponding set section I. According to various embodiments, the electronic device 100 may correct the previously set initial value to an average of calculated values corresponding to the light intensity information that is detected whenever the rotary member 102 is rotated through the corresponding set section I. When set rotary sections I have the same angle on the rotary member 102 and the initial values, which correspond to the rotary sections I, are equal to each other, the electronic device 100 may correct the previously set initial value to an average of the calculated values for the rotated angles detected in the respective set sections I.

In describing the method of calculating the rotated angle of the rotary member 102 according to various embodiments of the present disclosure, it has been described that a determination as to whether the set section I has been rotated may be made based on image data that the second region (e.g., the detection surface 121b or a hole type opening). However, the present disclosure is not needed to be limited thereto. According to various embodiments, it is possible to determine whether the rotary member 102 has been rotated through the set section I depending on whether the detent 127 is engaged in one of the plurality of recesses 121c formed on the rotary member 102. According to various embodiments, a determination as to whether the rotary member 102 has been rotated through the set section I and/or the detent 127 has engaged another of the recesses 121c may be made based on a combination of a determination as to whether the second region (e.g., the detection surface 121b) is detected and a determination as to whether the detent 127 is engaged.

According to various embodiments, The electronic device 100 (e.g., the control unit 110 and/or the processor 21 to be described later) may be set to change and provide a user interface (e.g., a function mode) based on the rotated angle of the rotary member 102. For example, the method 10 may further include an operation of changing and providing a user interface (e.g., a function mode) based on the rotated angle of the rotary member.

According to various embodiments of the present disclosure, the electronic device 100 (e.g., the control unit 110) may detect the rotated angle of the rotary member 102 using the sensor module (e.g., an optical sensor), and may detect the practically rotated angle (e.g., the set section I) using the second region (e.g., the detection surface 121b) (and/or the detent). The electronic device 100 compares a detected rotated angle and an initial value corresponding to a set section to correct an error when the error occurs so that the electronic device 100 can precisely detect the rotated angle of the rotary member 102.

Figure 12:
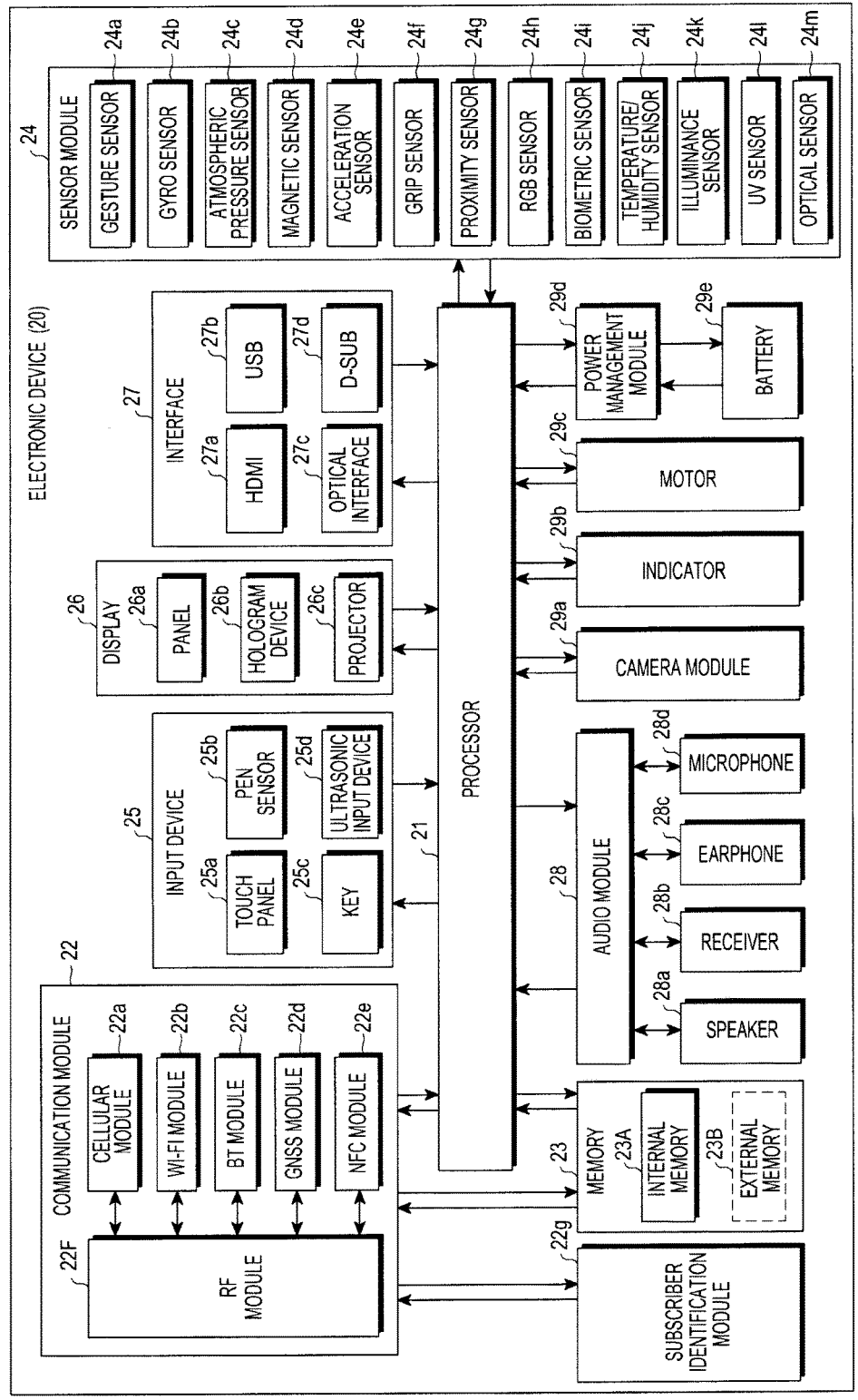
FIG. 12 is a block diagram illustrating an electronic device according to various embodiments of the present disclosure.

FIG. 12 is a block diagram illustrating an electronic device 20 according to various embodiments of the present disclosure.

Referring to FIG. 12, the electronic device 20 may include, for example, the entirety or a portion of the above-mentioned electronic device 100. The electronic device 20 may include at least one processor (e.g., Application Processor (AP)) 21, a communication module 22, a subscriber identification module 22g, a memory 23, a sensor module 24, an input device 25, a display 26, an interface 27, an audio module 28, a camera module 29a, a power management module 29d, a battery 29e, an indicator 29b, and/or a motor 29c.

The processor 21 may drive, for example, an operating system or an application program so as to control a plurality of hardware or software components connected thereto, and may also perform various data processing and arithmetic operations. The processor 21 may be implemented by, for example, a System-on-Chip (SoC). According to one embodiment, the processor 21 may further include a Graphic Processing Unit (GPU) and/or an image signal processor.

The processor 21 may include at least some components (e.g., the cellular module 22a) among the components illustrated in FIG. 12. The processor 21 may load a command or data that is received from at least one of the other components (e.g., a non-volatile memory) in a volatile memory to process the command and data, and may store various data in a non-volatile memory. According to various embodiments, the processor 21 may provide functions of the control unit (e.g., the control unit 110 of FIG. 10) and/or the calculating unit (e.g., the calculating unit 150 of FIG. 10).

The communication module 22 may include, for example, a cellular module 22a, a WiFi module 22b, a Bluetooth module 22c, a GNSS module 22d (e.g., a GPS module, a Glonass module, a Beidou module, or a Galileo module), an NFC module 22e, and a Radio Frequency (RF) module 22f.

The cellular module 22a may provide, for example, a voice call, a video call, a message service, or an internet service through, for example, a communication network. According to one embodiment, the cellular module 22a may perform discrimination and authentication of the electronic device 20 within the communication network by using the subscriber identification module (e.g., a SIM card) 22g. According to one embodiment, the cellular module 22a may perform at least some of the functions that may be provided by the processor 21. According to one embodiment, the cellular module 22a may include a Communication Processor (CP).

Each of the WiFi module 22b, the Bluetooth module 22c, the GNSS module 22d, and the NFC module 22e may include, for example, a processor to process data transmitted/received through a corresponding module. According to a certain embodiment, at least some (e.g., two or more) of the cellular module 22a, the WiFi module 22b, the Bluetooth module 22c, the GNSS module 22d, and the NFC module 22e may be incorporated in a single Integrated Chip (IC) or an IC package.

The RF module 22f may transmit or receive, for example, a communication signal (e.g., an RF signal). The RF module 22f may include, for example, a transceiver, a Power Amp Module (PAM), a frequency filter, a Low Noise Amplifier (LNA), or an antenna. According to another embodiment, at least one of the cellular module 22a, the WiFi module 22b, the Bluetooth module 22c, the GPS module 22d, and the NFC module 22e may transmit/receive an RF signal through one or more separate RF modules.

The subscriber identification module 22g may include, for example, a card that includes a subscriber identification module and/or an embedded SIM, and may also include intrinsic identification information (e.g., Integrated Circuit Card IDentifier (ICCID)) or subscriber information (e.g., International Mobile Subscriber Identity (IMSI)).

The memory 23 may include, for example, an internal memory 23a or an external memory 23b, and may form at least a portion of the memory (e.g., the memory 170 of FIG. 10) of the above-described electronic device 100. The internal memory 23a may include at least one of, for example, a volatile memory (e.g., a Dynamic RAM (DRAM), a Static RAM (SRAM), or a Synchronous DRAM (SDRAM)), and a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard drive, or a Solid State Drive (SSD)).

The external memory 23b may further include a flash drive (e.g., Compact Flash (CF), Secure Digital (SD), Micro Secure Digital (Micro-SD), Mini Secure Digital (Mini-SD), extreme Digital (xD), Multi-Media Card (MMC), or memory stick). The external memory 23b may be functionally and/or physically connected to the electronic device 20 through various interfaces.

For example, the sensor module 24 may measure a physical quantity or may sense an operating status of the electronic device 20, and may then convert the measured or sensed information into electric signals. For example, the sensor module 24 may include at least one of: a gesture sensor 24a, a gyro sensor 24b, an atmospheric pressure sensor 24c, a magnetic sensor 24d, an acceleration sensor 24e, a grip sensor 24f, a proximity sensor 24g, a color sensor 24h (e.g., RGB (Red, Green, Blue) sensor), a biometric sensor 24i, a temperature/humidity sensor 24j, an illuminance sensor 24k, a Ultra-Violet (UV) sensor 24l, and an optical sensor 24m. According to various embodiments, at least one of the sensors included in the sensor 24 (e.g., the gesture sensor 24a or the optical sensor 24m) may operate as a sensor (e.g., the sensor module 103 of FIG. 4) of the above-described electronic device 100. Additionally or alternatively, the sensor module 24 may include, for example, an E-nose sensor, an ElectroMyoGraphy (EMG) sensor (not illustrated), an ElectroEncephaloGram (EEG) sensor, an ElectroCardioGram (ECG) sensor, an Infra-Red (IR) sensor, an iris sensor, and/or a fingerprint sensor. The sensor module 24 may further include a control circuit for controlling one or more sensors incorporated therein. In a certain embodiment, the electronic device 20 may further include a processor configured to control the sensor module 24 as a part of the processor 21 or separate from the processor 21 so as to control the sensor module 24 while the processor 21 is in the sleep state. For example, the control unit (e.g., the control unit 110 of FIG. 10) for controlling the sensor (e.g., the sensor module 103 of FIG. 4) of the above-described electronic device 100 may be provided by the processor 21 or may be provided separately from the processor 21.

The input device 25 may include, for example, a touch panel 25a, a (digital) pen sensor 25b, a key 25c, or an ultrasonic input device 25d. The sensor module 103 of the electronic device 100 may be a portion of the above-described sensor module 24, and according to another embodiment, may be provided as a portion of the input device 25. For example, the above-described electronic device 100 may generate an input signal through a signal detected from the sensor module 103.

The touch panel 25a may include at least one of, for example, a capacitive type touch panel, a resistive type touch panel, an infrared type touch panel, and an ultrasonic type panel. In addition, the touch panel 25a may further include a control circuit. The touch panel 25a may further include a tactile layer so as to provide a tactile reaction to a user.

The (digital) pen sensor 25b may be, for example, a portion of the touch panel or may include a separate recognition sheet. The key 25c may include, for example, a physical button, an optical key, or a keypad. The ultrasonic input device 25d may sense, through a microphone (e.g., a microphone 28d), ultrasonic waves that are generated by an input tool so as to confirm data corresponding to the sensed ultrasonic waves.

The display 26 may include at least one of a panel 26a, a hologram device 26b, and a projector 26c. The panel 26a may be implemented to be flexible, transparent, or wearable. The panel 26a may be configured as a single module with the touch panel 25a. The hologram device 26b may show a stereoscopic image in the air using interference of light. The projector 26c may project light onto a screen so as to display an image. The screen may be located, for example, inside or outside the electronic device 20. According to one embodiment, the display 26 may further include a control circuit to control the panel 26a, the hologram device 26b, or the projector 26c.

The interface 27 may include, for example, a High-Definition Multimedia Interface (HDMI) 27a, a Universal Serial Bus (USB) 27b, an optical interface 27c, or a D-subminiature (D-sub) 27d. Additionally or alternatively, the interface 27 may include, for example, a Mobile High-definition Link (MHL) interface, a Secure Digital (SD) card/Multi-Media Card (MMC) interface, and/or an Infrared Data Association (IrDA) standard interface.

The audio module 28 may bi-directionally convert, for example, sound and electric signals. The audio module 28 may process sound information input or output through, for example, a speaker 28a, a receiver 28b, an earphone 28c, or a microphone 28d.

The camera module 29a is a device that is capable of photographing, for example, a still image and a moving image. According to one embodiment, the camera module 291 may include one or more image sensors (e.g., a front sensor or a rear sensor), a lens, an Image Signal Processor (ISP), or a flash (e.g., LED or xenon lamp).

The power management module 29d may manage, for example, the electric power of the electronic device 20. According to one embodiment, the power management module 29d may include a Power Management Integrated Circuit (PMIC), a charger Integrated Circuit (IC), or a battery or fuel gauge. The PMIC may be configured in a wired and/or wireless charge type. The wireless charge type may include, for example, a magnetic resonance type, a magnetic induction type, or an electromagnetic wave type, and may further include an additional circuit for wireless charging (e.g., a coil loop, a resonance circuit, or a rectifier). The battery gauge may measure the residual capacity of the battery 29e, and a voltage, a current, and/or a temperature during the charge. The battery 29e may include, for example, a rechargeable battery and/or a solar battery.

The indicator 29b may indicate a specific status of the electronic device 20 or of a part thereof (e.g., the processor 21), such as a booting status, a message status, or a charged status. The motor 29c may convert an electric signal into a mechanical vibration, and may generate, for example, a vibration or a haptic effect. Although not illustrated, the electronic device 20 may include a processor (e.g., a GPU) to support a mobile TV. The processor to support a mobile TV may process media data according to the standards of, for example, Digital Multimedia Broadcasting (DMB), Digital Video Broadcasting (DVB), or MediaFlo™ (which is a technology for transmitting audio, video, and data to portable devices).

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

As described above, according to various embodiments, there is provided an electronic device that may include: a main body; a rotary member rotatably mounted upon and enclosing at least a portion of the main body, the rotary member including a first region corresponding to a first attribute and a second region corresponding to a second attribute, the first and second regions being alternately arranged on one face of the rotary member; a sensor module configured to acquire attribute information corresponding to at least a partial region of the rotary member as the rotary member is rotated; and a processor that may be configured to confirm a change in at least one of the first attribute and the second attribute and to determine at least one of a rotated angle and a rotated direction of the rotary member based on the change.

According to various embodiments, the first attribute may include a first pattern, a first reflectivity, a first color, a first form, or a combination thereof, and the second attribute may include a second pattern, a second reflectivity, a second color, a second form, or a combination thereof.

According to various embodiments, the first region or the second region may include an opening formed therein.

According to various embodiments, the sensor module may further include: a light emission element that emits light to at least a partial region of the rotary member; and a light reception element that receives light emitted from the light emission element and reflected from at least a partial region of the rotary member.

According to various embodiments, the above described electronic device may further include: a memory that stores one or more reference value sets corresponding to light intensity.

According to various embodiments, the processor may be set to: determine light intensity information corresponding to at least a partial region from the attribute information, compare the light intensity information with the one or more reference value sets, and determine a rotated angle or a rotated direction of the rotary member based on a result of the comparison.

According to various embodiments, the second region may be arranged at a designated angle of rotation relative to a first position on the one face, and the processor may be set to correct the rotated angle or the rotated direction using the designated angle in the case where the light intensity information corresponds to the second attribute.

According to various embodiments, the processor may be set to change a user interface and to provide the changed user interface based on the rotated angle of the processor.

According to various embodiments, the above-described electronic device may further include a display device disposed on the front face of the main body, and the rotary member may include a ring member mounted around the display device.

According to various embodiments of the present disclosure, there is provided a method of calculating a rotated angle of a rotary member in an electronic device that includes the rotary member. The method may include: an operation of setting at least one initial value calculated to correspond to light intensity information at a set rotary section; an operation of detecting a rotated angle or a rotated direction based on the change of the light intensity information when the rotary member is rotated; an operation of calculating a value corresponding to a change of the light intensity information when the rotary member is rotated over the set rotary section and comparing the calculated value to the set initial value; and an operation correcting the initial value corresponding to the set rotary section depending on a comparison result of the calculated value and the set initial value.

The light intensity information may be acquired through light reflected from a first region and a second region, which correspond to a first attribute and a second region, respectively, and are alternately formed on one face of the rotary member.

According to various embodiments, the operation of detecting the rotated angle of the rotary member may include: an operation of acquiring attribute information corresponding to at least a partial region of the rotary member as the rotary member is rotated; an operation of detecting a change in the first attribute or the second attribute of at least the partial region based on the light intensity information; and an operation of determining the rotated angle or the rotated direction of the rotary member based on the change.

According to various embodiments, the operation of setting the initial value may further include an operation of storing one or more reference value sets corresponding to light intensity information.

According to various embodiments, the operation of detecting the rotated angle of the rotary member may include: an operation of determining the rotated angle or the rotated direction of the rotary member by comparing the light intensity information detected while the rotary member is rotated and the one or more reference value sets.

According to various embodiments, the second region is arranged at a designated angle of rotation relative to an initial position of the rotary member, and the correcting the initial value corrects the initial value based on the calculated value in a case where the detected light intensity information corresponds to the second attribute.

According to various embodiments, the first attribute includes information based on a first pattern, a first reflectivity, a first color, a first form, or a combination thereof, and the second attribute includes information based on a second pattern, a second reflectivity, a second color, a second form, or a combination thereof.

According to various embodiments, the set rotary section may be set as a section between two adjacent second regions with one first region being interposed therebetween, and when attribute information corresponding to the two adjacent second regions are sequentially acquired, it may be determined that the rotary member has been rotated through the set rotary section.

According to various embodiments, the operation of correcting the initial value may include an operation of resetting the initial value to correspond to the calculated value when the difference between the calculated value and the set initial value exceeds a tolerance.

According to various embodiments, the operation of correcting the initial value may include an operation of maintaining the set initial value when the difference between the calculated value and the set initial value is within a tolerance.

According to various embodiments, the rotated range of the rotary member may include a plurality of set rotary sections which are set to have the same angle range, and the operation of correcting the initial value may include an operation of resetting the initial value for each of the set rotary sections to correspond to an average of the calculated values when the rotary member has been rotated the respective set rotary sections.

According to various embodiments, the method further may further comprise an operation of changing a user interface based on the detected rotated angle.

While the present disclosure has been shown and described with reference to certain embodiments thereof, it will be understood by those skilled in the art that various changes in form and details may be made therein without departing from the spirit and scope of the present disclosure as defined by the appended claims.

What is claimed is:

1. An electronic device comprising:
   a main body;
   a rotary member mounted upon the main body while enclosing at least a portion of the main body and rotating with respect to the main body, the rotary member including a first region corresponding to a first attribute and a second region corresponding to a second attribute, the first and second regions being alternately arranged on one face of the rotary member;
   a sensor module configured to acquire attribute information corresponding to at least a partial region of the one face of the rotary member as the rotary member is rotated; and
   a processor,
   wherein the processor is configured to confirm a change in at least one of the first attribute and the second attribute and to determine at least one of a rotated angle and a rotated direction of the rotary member based on the change.

2. The electronic device of claim 1, wherein the first attribute includes at least one of a first pattern, a first reflectivity, a first color, a first form, and
   the second attribute includes at least one of a second pattern, a second reflectivity, a second color, and a second form.

3. The electronic device of claim 1, wherein at least one of the first region and the second region includes an opening formed therein.

4. The electronic device of claim 1, wherein the sensor module includes:
   a light emission element that emits light to at least the partial region of the rotary member; and
   a light reception element that receives light emitted from the light emission element and reflected from at least the partial region of the rotary member.

5. The electronic device of claim 1, further comprising:
   a memory that stores at least one reference value set corresponding to light intensity.

6. The electronic device of claim 5, wherein the processor is set to:
   determine light intensity information corresponding to at least the partial region from the attribute information,
   compare the light intensity information with the one or more reference value sets, and
   determine at least one of a rotated angle and a rotated direction of the rotary member based on a result of the comparison.

7. The electronic device of claim 6, wherein the second region is arranged at a designated angle of rotation relative to a first position on the one face, and
   the processor is set to correct at least one of the rotated angle and the rotated direction using the designated angle in a case where the light intensity information corresponds to the second attribute.

8. The electronic device of claim 1, wherein the processor is set to change and provide a user interface displayed on a display or implemented in an acoustic manner based on the rotated angle.

9. The electronic device of claim 1, further comprising:
   a display device disposed on a front face of the main body,
   wherein the rotary member includes a ring member mounted around the display device.

10. A method of calculating a rotated angle of a rotary member of an electronic device, the method comprising:
    setting at least one initial value calculated to correspond to light intensity information at a set rotary section;
    detecting at least one of a rotated angle and a rotated direction based on a change of the light intensity information when the rotary member is rotated;
    calculating a value corresponding to a change of the light intensity information when the rotary member is rotated over the set rotary section and comparing the calculated value to the set initial value; and
    correcting the initial value corresponding to the set rotary section, depending on a comparison result of the calculated value and the set initial value,
    wherein the light intensity information is acquired through light reflected from at least one first region and at least one second region, which correspond to a first attribute and a second attribute, respectively, and are alternately formed on one face of the rotary member.

11. The method of claim 10, wherein the detecting the rotated angle of the rotary member includes:
    acquiring attribute information corresponding to at least a partial region of the rotary member as the rotary member is rotated;
    detecting a change in at least one of the first attribute and the second attribute of at least the partial region based on the light intensity information; and
    determining at least one of the rotated angle and the rotated direction of the rotary member based on the change.

12. The method of claim 10, wherein the setting of the initial value further includes:
    storing at least one reference value corresponding to the light intensity information.

13. The method of claim 12, wherein the detecting of the rotated angle of the rotary member includes:
    determining at least one of the rotated angle and the rotated direction of the rotary member by comparing the light intensity information detected while the rotary member is rotated with the at least one reference value.

14. The method of claim 13, wherein the second region is arranged at a designated angle of rotation relative to an initial position of the rotary member, and
    the correcting the initial value corrects the initial value based on the calculated value in a case where the detected light intensity information corresponds to the second attribute.

15. The method of claim 10, wherein the first attribute includes information based on at least one of a first pattern, a first reflectivity, a first color, and a first form, and the second attribute includes information based on at least one of a second pattern, a second reflectivity, a second color, and a second form.

16. The method of claim 10, wherein the at least one second region includes two adjacent second regions, and the set rotary section is set as a section between the two adjacent second regions with one first region being interposed therebetween, and when attribute information corresponding the two adjacent second regions are sequentially acquired, it is determined that the rotary member has been rotated through the set rotary section.

17. The method of claim 10, wherein the correcting of the initial value includes:
resetting the initial value to correspond to the calculated value when the difference between the calculated value and the set initial value exceeds a tolerance.

18. The method of claim 10, wherein the correcting of the initial value includes:
maintaining the set initial value when the difference between the calculated value and the set initial value is within a tolerance.

19. The method of claim 10, wherein a rotated range of the rotary member includes a plurality of set rotary sections which are set to have an equal angle range, and
the correcting the initial value includes resetting the initial value for each of the set rotary sections to correspond to an average of the calculated values when the rotary member has been rotated over the respective set rotary sections.

20. The method of claim 10, further comprising:
changing a user interface displayed on a display or implemented in an acoustic manner based on the detected rotated angle.

* * * * *